United States Patent
Fujimoto et al.

(10) Patent No.: US 11,419,341 B2
(45) Date of Patent: Aug. 23, 2022

(54) INSIDE AIR CONTROL SYSTEM

(71) Applicant: DAIKIN INDUSTRIES, LTD., Osaka (JP)

(72) Inventors: Yuusuke Fujimoto, Osaka (JP); Noritaka Kamei, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/003,547

(22) Filed: Aug. 26, 2020

(65) Prior Publication Data
US 2020/0390116 A1   Dec. 17, 2020

Related U.S. Application Data

(63) Continuation of application No. PCT/JP2019/007640, filed on Feb. 27, 2019.

(30) Foreign Application Priority Data

Feb. 27, 2018   (JP) ............................. JP2018-033885

(51) Int. Cl.
*A23B 7/148*   (2006.01)
*A01F 25/14*   (2006.01)
*A23B 7/04*    (2006.01)

(52) U.S. Cl.
CPC .............. *A23B 7/148* (2013.01); *A01F 25/14* (2013.01); *A23B 7/04* (2013.01)

(58) Field of Classification Search
CPC ............. G01N 33/0036; G01N 33/004; G01N 33/0006; B65D 81/245; B65D 81/2069;
(Continued)

(56) References Cited

U.S. PATENT DOCUMENTS 4,142,372 A * 3/1979 Kato ...................... A23B 7/148
                                                          62/78
4,642,996 A * 2/1987 Harris .................. B60H 3/0007
                                                          62/78
(Continued)

FOREIGN PATENT DOCUMENTS

CN       101726146 A      6/2010
JP         4-41315 A      2/1992
(Continued)

OTHER PUBLICATIONS

International Search Report (PCT/ISA/210) issued in PCT/JP2019/007640 dated May 28, 2019.
(Continued)

*Primary Examiner* — Thien S Tran
(74) *Attorney, Agent, or Firm* — Birch, Stewart, Kolasch & Birch, LLP

(57) ABSTRACT

While an inside air control system is performing an air composition maintenance action, a controller instructs a gas supply device to operate while switching among a first supply operation, a second supply operation, an outside air supply operation, and a standby operation. In the first supply operation, first low oxygen concentration air is supplied into a container. In the second supply operation, second low oxygen concentration air having a lower oxygen concentration than the first low oxygen concentration air is supplied into the container. In the outside air supply operation, outside air is supplied into the container. In the standby operation, supply of the low oxygen concentration air and the outside air into the container is stopped.

10 Claims, 12 Drawing Sheets

(58) Field of Classification Search
CPC .............. B65D 88/745; B65D 90/008; B65D 81/2076; B65D 2588/746; B65D 88/74; A23B 7/148; A23B 7/04; A23B 7/144; A23B 9/18; F25D 11/003; F25D 29/003; F25D 3/105; F25D 17/042; F25D 11/00; F25D 23/00; F25D 17/04; F25D 29/00; F25B 49/005; B60P 3/20; A23L 3/3418; A23L 3/363; A23L 3/3427; A23L 3/3481; A23L 3/3445; A10F 25/14; A01F 2025/147; A01F 25/00; B01D 53/047; B01D 2259/40009; Y02A 50/20; Y02A 50/244; G05D 23/1902
USPC ....... 702/22, 23, 24, 27, 30–32, 50, 85, 104, 702/107, 116, 127, 176, 178, 179, 181, 702/182, 183, 188, 406; 62/1, 18, 78, 89, 62/91, 94, 384, 388, 239, 179, 48.1, 62/176.6, 176.1, 176.4, 176.3, 216, 51.1, 62/514 R, 126, 127, 178, 131, 414, 419, 62/46.3, 46.2, 53.2, 62, 150, 166, 273, 62/151, 180, 186, 240, 229, 230; 426/418, 419, 312, 314, 231; 55/16, 158, 55/58, 59, 62, 74, 179, 387; 236/44 R, 236/44 C, 44 B, 44 A; 99/467, 468, 472, 99/473, 474; 364/184, 556, 557, 418, 364/510; 98/6, 36; 165/21, 32, 62, 63; 9/468, 474, 475, 40
See application file for complete search history.

(56) References Cited

U.S. PATENT DOCUMENTS

| | | | | |
|---|---|---|---|---|
| 4,710,206 A * | 12/1987 | Allen | ................. | B01D 53/0476 95/97 |
| 4,754,611 A * | 7/1988 | Hosaka | ................. | A23B 7/144 426/314 |
| 4,817,391 A * | 4/1989 | Roe | ........................ | A23B 7/148 62/624 |
| 4,829,774 A * | 5/1989 | Wassibauer | ............. | A23L 3/363 62/78 |
| 4,833,892 A * | 5/1989 | Wassibauer | ........... | A23L 3/3418 62/216 |
| 4,843,956 A * | 7/1989 | Lashlee | ................. | A23B 7/144 99/468 |
| 4,987,745 A * | 1/1991 | Harris | ................... | A23L 3/3418 62/78 |
| 5,457,963 A * | 10/1995 | Cahill-O'Brien | ...... | G05D 21/02 62/78 |
| 5,872,721 A * | 2/1999 | Huston | ................. | A23B 7/148 702/24 |
| 7,089,751 B2 * | 8/2006 | Fleming, Jr. | .......... | F25D 17/042 62/78 |
| 8,177,883 B2 * | 5/2012 | Jorgensen | .......... | B65D 81/2076 95/12 |
| 2003/0146394 A1 * | 8/2003 | Prange | ............... | G01N 21/6486 250/458.1 |
| 2007/0221225 A1 * | 9/2007 | Kutt | .................. | A61M 16/0051 128/205.26 |
| 2010/0189849 A1 * | 7/2010 | Tracy | ..................... | A23B 7/152 426/231 |
| 2013/0013099 A1 * | 1/2013 | Delele | .................... | A23B 7/148 700/214 |
| 2013/0019961 A1 * | 1/2013 | Rogers | ................. | F25D 17/042 137/334 |
| 2014/0165838 A1 * | 6/2014 | Suzuki | .................. | C08F 232/04 96/13 |
| 2017/0112171 A1 * | 4/2017 | Cermak | ................ | B01D 53/22 |
| 2017/0355518 A1 * | 12/2017 | Zita | ........................ | A23B 7/148 |
| 2018/0235247 A1 | 8/2018 | Kamei et al. | | |
| 2019/0141903 A1 | 5/2019 | Takayama et al. | | |
| 2020/0390116 A1 * | 12/2020 | Fujimoto | ............... | A23B 7/148 |

FOREIGN PATENT DOCUMENTS

| | | | |
|---|---|---|---|
| JP | 07-313052 | * | 12/1995 |
| JP | 2017-44452 A | | 3/2017 |
| JP | 2017-190935 A | | 10/2017 |

OTHER PUBLICATIONS

International Search Report and Written Opinion of the International Searching Authority for International Application No. PCT/JP2019/007640 dated Sep. 3, 2020.
Extended European Search Report dated Mar. 1, 2021 in corresponding European Application No. 19760575.1.

* cited by examiner

FIG.9

TIME POINTS AT WHICH VALVES SWITCH AND INTERNAL STATES OF ABSORPTION COLUMNS

| OPERATION | FIRST OPERATION | PRESSURE EQUALIZATION OPERATION | SECOND OPERATION | PRESSURE EQUALIZATION OPERATION |
|---|---|---|---|---|
| FIRST DIRECTIONAL CONTROL VALVE | FIRST STATE | | SECOND STATE | FIRST STATE |
| SECOND DIRECTIONAL CONTROL VALVE | FIRST STATE | | SECOND STATE | |
| FIRST ADSORPTION COLUMN | PRESSURIZATION/ADSORPTION | PRESSURIZATION/ ADSORPTION | DEPRESSURIZATION/DESORPTION | PRESSURIZATION/ ADSORPTION |
| SECOND ADSORPTION COLUMN | DEPRESSURIZATION/DESORPTION | PRESSURIZATION/ ADSORPTION | PRESSURIZATION/ADSORPTION | PRESSURIZATION/ ADSORPTION |

FIG.10

$O_2$ 5% MODE

| OPERATION | FIRST OPERATION | PRESSURE EQUALIZATION OPERATION | SECOND OPERATION | PRESSURE EQUALIZATION OPERATION |
|---|---|---|---|---|
| EXHAUST ON-OFF VALVE | OPEN | CLOSED | OPEN | CLOSED |
| SUPPLY ON-OFF VALVE | CLOSED | OPEN | CLOSED | OPEN |
| NITROGEN-ENRICHED AIR | EXHAUSTED | SUPPLIED | EXHAUSTED | SUPPLIED |

FIG.11

$O_2$ 8% MODE

| OPERATION | FIRST OPERATION | PRESSURE EQUALIZATION OPERATION | SECOND OPERATION | PRESSURE EQUALIZATION OPERATION |
|---|---|---|---|---|
| EXHAUST ON-OFF VALVE | CLOSED | | | |
| SUPPLY ON-OFF VALVE | OPEN | | | |
| NITROGEN-ENRICHED AIR | SUPPLIED | | | |

FIG.13

| FIRST CONDITION (OUTSIDE AIR → OXYGEN 8%) | FIFTH CONDITION (OXYGEN 8% → BREATHING) |
|---|---|
| or { & [ · OPERATION CONTROL FLAG=0 & [ · $MV\_O2 \geq SP\_O2 + p3$ · $MV\_CO2 \geq SP\_CO2 + q2$ · CONTINUED FOR 10 MINUTES ] ], [ · OPERATION CONTROL FLAG=1 & [ · $MV\_O2 \geq SP\_O2 + p3$ · CONTINUED FOR 10 MINUTES ] ] } | & { or { & [ · OPERATION CONTROL FLAG=0 & [ · $MV\_O2 \leq SP\_O2$ · $MV\_CO2 \leq SP\_CO2$ · CONTINUED FOR 10 MINUTES ] ], & [ · $MV\_O2 \geq SP\_O2 + p2$ · CONTINUED FOR 10 MINUTES ] } } |
| SECOND CONDITION (OXYGEN 8% → OUTSIDE AIR) | SIXTH CONDITION (BREATHING → OXYGEN 8%) |
| & [ · $MV\_O2 \leq SP\_O2 - p3$ · CONTINUED FOR 10 MINUTES ] | or { · OPERATION CONTROL FLAG=1 & [ · $MV\_O2 \leq SP\_O2 - p4$ · $MV\_CO2 \geq SP\_CO2 + q2$ · CONTINUED FOR 10 MINUTES ] } |
| THIRD CONDITION (OUTSIDE AIR → BREATHING) | SEVENTH CONDITION (OXYGEN 8% → OXYGEN 5%) |
| & [ · OPERATION CONTROL FLAG=0 & [ · $MV\_O2 \geq SP\_O2$ · $MV\_CO2 \leq SP\_CO2 + q3$ · CONTINUED FOR 10 MINUTES ] ] | & [ · OPERATION CONTROL FLAG=1 & [ · $MV\_O2 \geq SP\_O2 + p1$ · CONTINUED FOR 10 MINUTES ] ] |
| FOURTH CONDITION (BREATHING → OUTSIDE AIR) | EIGHTH CONDITION (OXYGEN 5% → OUTSIDE AIR) |
| & [ · OPERATION CONTROL FLAG=0 & [ · $MV\_O2 \leq SP\_O2 - p3$ · CONTINUED FOR 10 MINUTES ] ] | & [ · OPERATION CONTROL FLAG=1 & [ · $MV\_O2 \leq SP\_O2 - p3$ · CONTINUED FOR 10 MINUTES ] ] |

SETTING CONDITION

& $\begin{bmatrix} \cdot SP\_O2-p3 \leqq MV\_O2 \leqq SP\_O2+p3 \\ \cdot MV\_CO2 \geqq SP\_CO2+q1 \\ \cdot \text{CONTINUED FOR 10 MINUTES} \end{bmatrix}$

CLEARING CONDITION

& $\begin{bmatrix} \cdot MV\_O2 \leqq SP\_O2 \\ \cdot MV\_CO2 \leqq SP\_CO2+q2 \\ \cdot \text{CONTINUED FOR 10 MINUTES} \end{bmatrix}$

INSIDE AIR CONTROL SYSTEM

CROSS REFERENCE TO RELATED APPLICATIONS

This application is a Continuation of PCT International Application No. PCT/JP2019/007640, filed on Feb. 27, 2019, and which claims priority under 35 U.S.C. 119(a) to Patent Application No. 2018-033885, filed in the Japanese Patent Office on Feb. 27, 2018, all of which are hereby expressly incorporated by reference into the present application.

TECHNICAL FIELD

The present disclosure relates to an inside air control system.

BACKGROUND ART

Patent Document 1 discloses a storage system implementing controlled atmosphere (CA) storage intended to preserve freshness of vegetables and fruits. This storage system includes a modified air generator unit producing modified air with a low oxygen concentration by a pressure swing adsorption (PSA) process.

The storage system of Patent Document 1 supplies modified air with an oxygen concentration of 4% into a storehouse to reduce the oxygen concentration in the storehouse. If the oxygen concentration in the storehouse reaches a target range, the storage system once stops supplying the modified air into the storehouse. While the supply of the modified air into the storehouse is stopped, breathing vegetables and fruits in the storehouse reduce the oxygen concentration in the storehouse, and increase the carbon dioxide concentration therein. As a result, the composition of air in the storehouse changes. Thus, to maintain the air in the storehouse at a desired composition, the storage system operates while switching among an outside air supply operation, a modified air supply operation, and a standby operation. During the outside air supply operation, outside air is supplied into the storehouse. During the modified air supply operation, modified air is supplied into the storehouse. During the standby operation, the supply of the modified air and the outside air into the storehouse is stopped.

CITATION LIST

Patent Documents

Patent Document 1: Japanese Unexamined Patent Publication No. H04-41315

SUMMARY

A first aspect of the present disclosure is directed to an inside air control system including: a gas supply device (30) configured to produce low oxygen concentration air having a lower oxygen concentration than outside air as a result of removal of oxygen from the outside air, the gas supply device (30) being capable of supplying the low oxygen concentration air and the outside air into a storage box (11) for storing a breathing plant (15); and a controller (55) configured to control an operation of the gas supply device (30). The inside air control system performs an oxygen concentration reduction action to reduce an oxygen concentration of inside air in the storage box (11) to a predetermined set oxygen concentration through the gas supply device (30) supplying the low oxygen concentration air into the storage box (11), and an air composition maintenance action to maintain the inside air at a desired composition after termination of the oxygen concentration reduction action. During the air composition maintenance action, the controller (55) is configured to instruct the gas supply device (30) to operate while switching among a first supply operation in which first low oxygen concentration air is supplied into the storage box (11), a second supply operation in which second low oxygen concentration air having a lower oxygen concentration than the first low oxygen concentration air is supplied into the storage box (11), an outside air supply operation in which the outside air is supplied into the storage box (11), and a standby operation in which supply of the low oxygen concentration air and the outside air into the storage box (11) is maintained at rest, so that the oxygen concentration of the inside air will be the set oxygen concentration, and a carbon dioxide concentration of the inside air will be a predetermined set carbon dioxide concentration.

BRIEF DESCRIPTION OF THE DRAWINGS

FIG. 9 is a timing chart illustrating time points at which valves switch and the states of adsorption columns during a gas production operation of a gas supply device of the embodiment.

FIG. 10 is a timing chart illustrating time points at which valves switch in an oxygen concentration 5% mode of the gas supply device of the embodiment.

FIG. 11 is a timing chart illustrating time points at which valves switch in an oxygen concentration 8% mode of the gas supply device of the embodiment.

FIG. 13 illustrates conditions for the state transitions shown in FIG. 12.

DESCRIPTION OF EMBODIMENTS

Embodiments of the present disclosure will now be described in detail with reference to the drawings.

Figure 1:
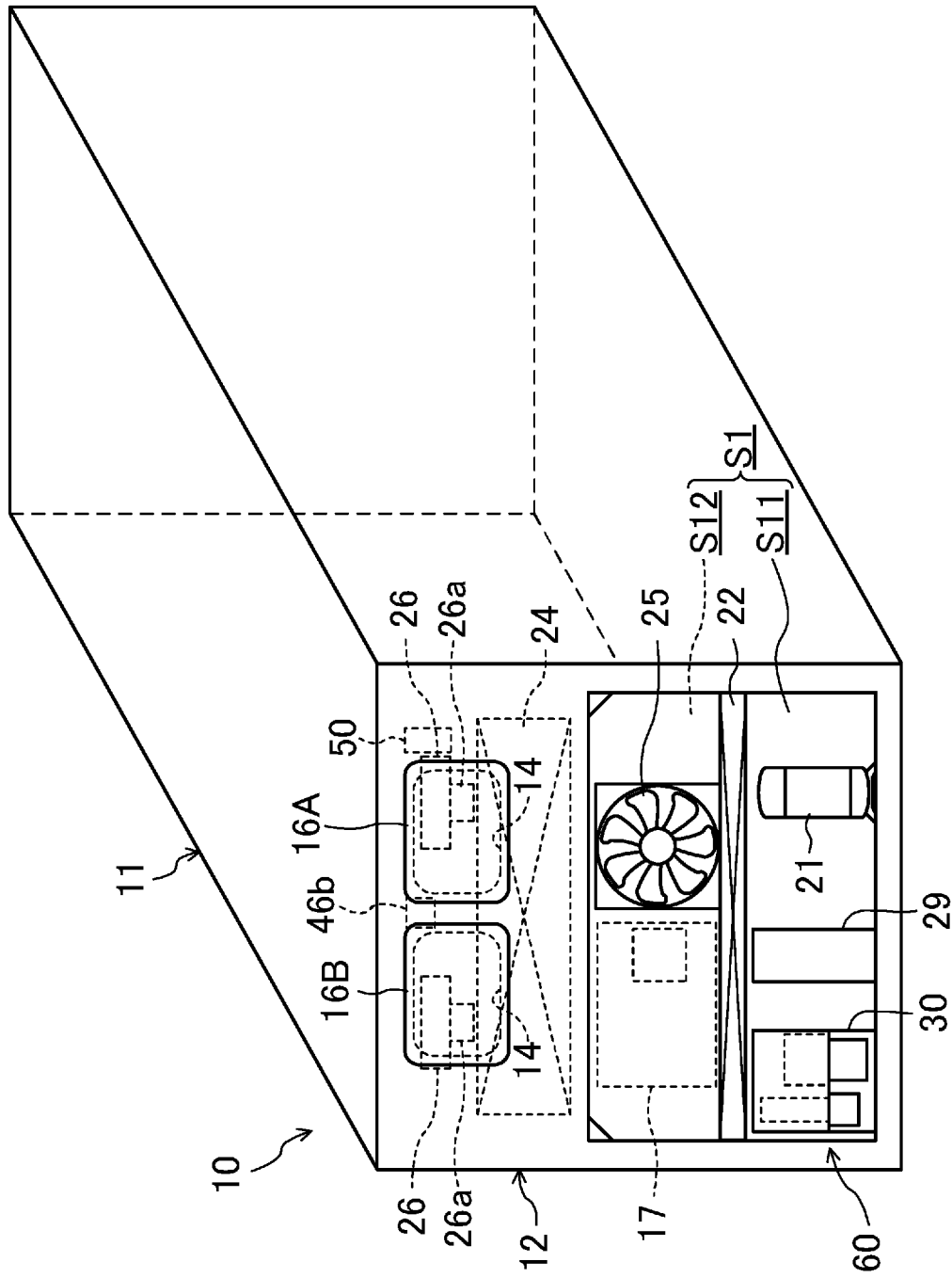
FIG. 1 is a perspective view illustrating a container refrigeration apparatus of an embodiment as viewed from outside.
Figure 2:
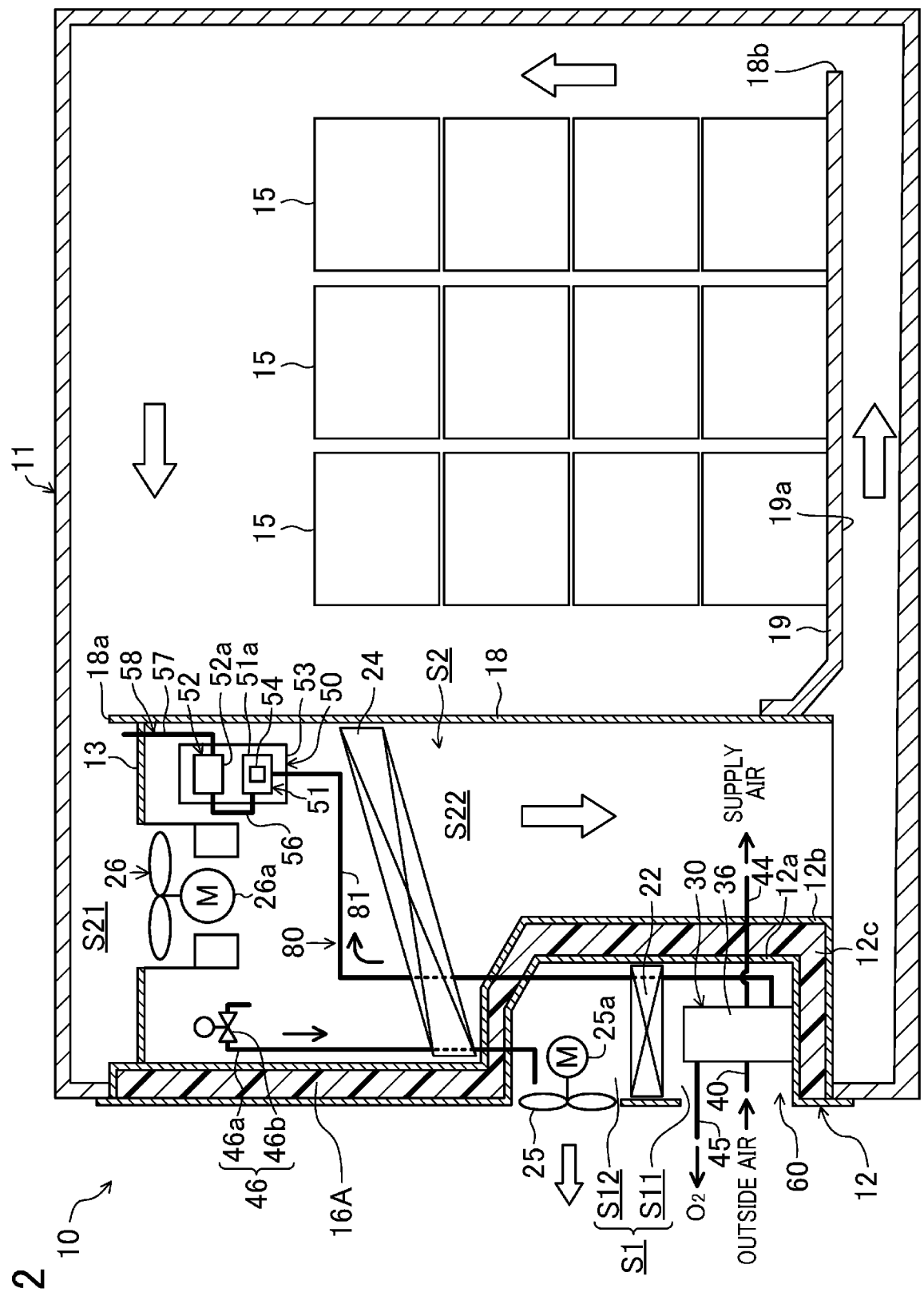
FIG. 2 is a cross-sectional view illustrating a general configuration of the container refrigeration apparatus of the embodiment.

As shown in FIGS. 1 and 2, a container refrigeration apparatus (10) is provided for a container (11) for use in, e.g., marine transportation, and cools the air in the container (11). The container (11) stores boxed plants (15). The plants (15) breathe by absorbing oxygen ($O_2$) in the air and releasing carbon dioxide ($CO_2$) into the air. Examples of such plants (15) include fruits like bananas and avocados, vegetables, cereals, bulbous plants, and natural flowers.

The container (11) has the shape of an elongate box with an open end surface. The container refrigeration apparatus (10) includes a casing (12), a refrigerant circuit (20) illustrated in FIG. 3, and a controlled atmosphere (CA) system (inside air control system) (60), and is attached to close an open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of an aluminum alloy, for example.

The exterior wall (12a) is attached to the periphery of the opening of the container (11) so as to close the open end of the container (11). The exterior wall (12a) is formed such that the lower part thereof protrudes into the container (11).

The interior wall (12b) is disposed to face the exterior wall (12a). The interior wall (12b) protrudes into the container (11) just like the lower part of the exterior wall (12a). A thermal insulator (12c) fills the space between the interior and exterior walls (12b, 12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) divides the internal storage space (S2) horizontally such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) is provided at an end of the floorboard (19) opposite from the open end of the container (11) (on the right side in FIG. 2). Through the blowout port (18b), the air which has been cooled by the container refrigeration apparatus (10) is blown into the container (11).

<Configuration and Arrangement of Refrigerant Circuit and Other Components>

Figure 3:
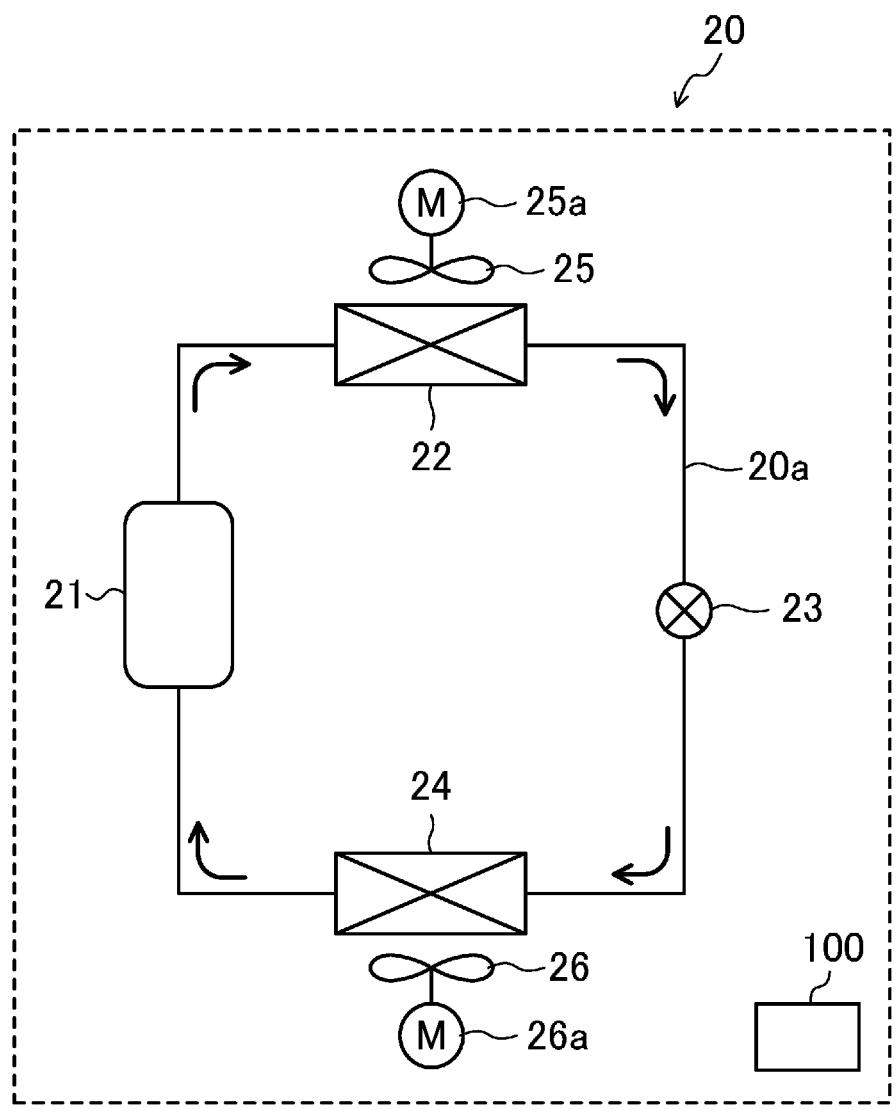
FIG. 3 is a piping diagram illustrating a configuration of a refrigerant circuit according to the embodiment.

As shown in FIG. 3, the refrigerant circuit (20) is a closed circuit in which a compressor (21), a condenser (22), an expansion valve (23), and an evaporator (24) are connected together in this order by a refrigerant piping (20a).

An external fan (25) is disposed near the condenser (22). The external fan (25) is driven in rotation by an external fan motor (25a), guides the air in the external space of the container (11) (i.e., outside air) into the external storage space (S1), and sends the guided air to the condenser (22). In the condenser (22), heat is exchanged between a refrigerant compressed in the compressor (21) and flowing through the condenser (22) and the outside air sent to the condenser (22) by the external fan (25). In this embodiment, the external fan (25) is comprised of a propeller fan.

Two internal fans (26) are disposed near the evaporator (24) (see FIG. 1). The internal fans (26) are driven in rotation by internal fan motors (26a), draw the air in the container (11) through the suction port (18a), and blow the air toward the evaporator (24). In the evaporator (24), heat is exchanged between a refrigerant having a pressure dropped by the expansion valve (23) and flowing through the evaporator (24) and the air in the container sent to the evaporator (24) by the internal fans (26).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electric component box (17) are disposed in the second space (S12). The first space (S11) is open toward the external space of the container (11). A plate member is arranged to close the second space (S12) from the external space of the container such that only a blowout port of the external fan (25) is open toward the external space of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<CA System>

Figure 4:
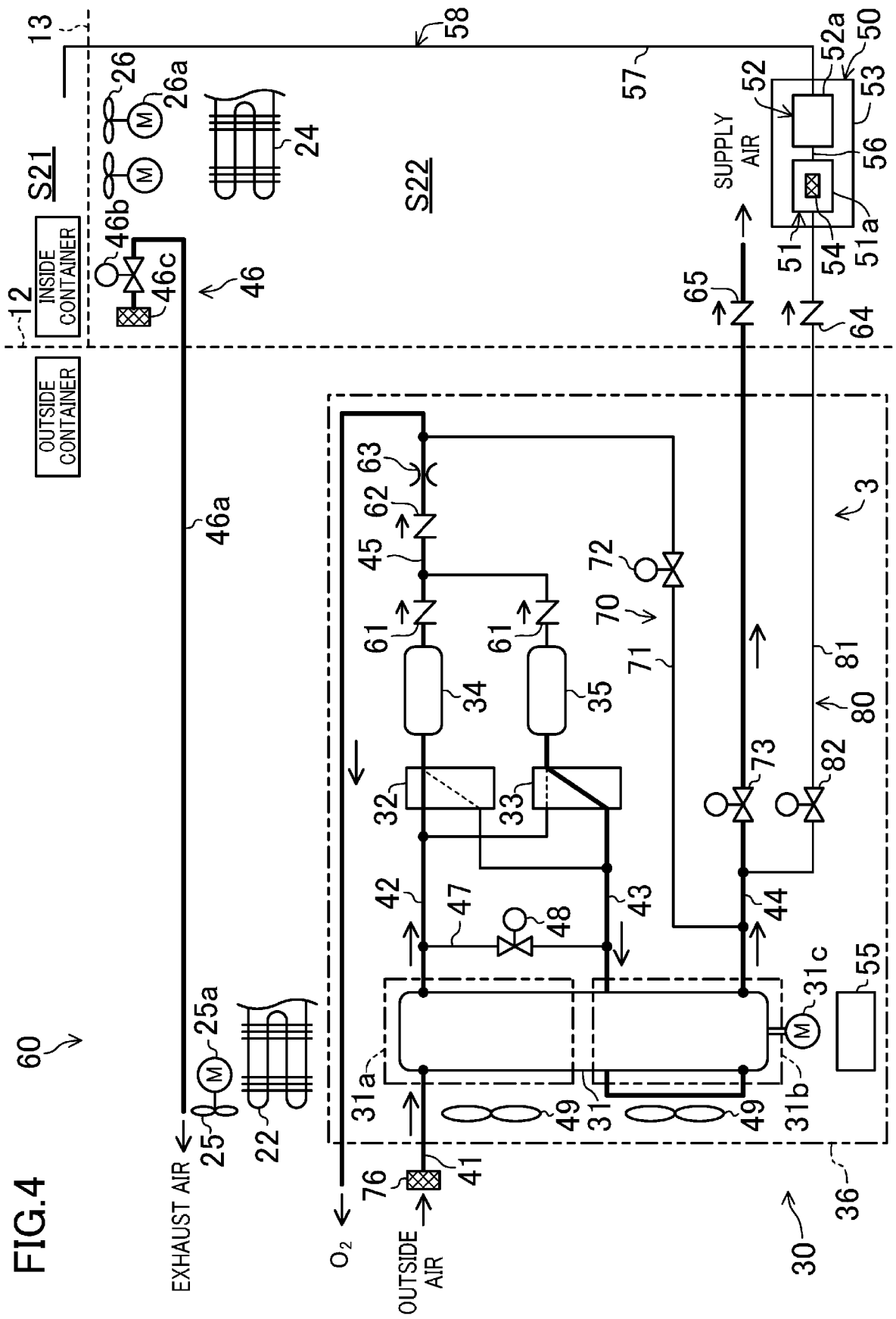
FIG. 4 is a piping diagram illustrating a configuration of a controlled atmosphere (CA) system according to the embodiment, together with a flow of air during a first operation.

As shown in FIG. 4, the CA system (60) that constitutes an inside air control system includes a gas supply device (30), an exhaust portion (46), a sensor unit (50), and a controller (55), and controls the oxygen concentration and carbon dioxide concentration of the air in the container (11). The term "concentration" to be used in the following description always indicates a "volumetric concentration."

[Gas Supply Device]

—Configuration of Gas Supply Device—

The gas supply device (30) removes oxygen from outside air to produce low oxygen concentration air, and supplies the produced air into the container (11). The low oxygen concentration air has a higher nitrogen concentration and a lower oxygen concentration, than outside air, and has a carbon dioxide concentration that is substantially equal to that of outside air. In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes an air circuit (3) connecting together an air pump (31), first and second directional control valves (32) and (33), and first and second adsorption columns (34) and (35) each provided with an adsorbent for adsorbing a nitrogen component in the air, and a unit case (36) housing these components of the air circuit (3). In this manner, the gas supply device (30) forms a single unit with these components housed in the unit case (36), and is configured to be retrofitted to the container refrigeration apparatus (10).

(Air Pump)

The air pump (31) is provided in the unit case (36), and includes a first pump mechanism (a pressurizing portion) (31a) and a second pump mechanism (a depressurizing portion) (31b), each of which sucks and compresses the air and discharges the compressed air. The first and second pump mechanisms (31a) and (31b) are connected to a drive shaft of a motor (31c), and are driven in rotation by the motor (31c) to suck and compress the air, and discharge the compressed air.

One end of an outside air passage (41) which is arranged to pass through the unit case (36) from the interior to exterior of the unit case (36) is connected to an inlet of the first pump mechanism (31a). An air-permeable, waterproof membrane filter (76) is provided at the other end of the outside air passage (41). The outside air passage (41) is made of a flexible tube. Although not shown in the drawings, the other end of the outside air passage (41) where the membrane filter (76) is provided is arranged in the second space (S12) of the external storage space (S1) above the condenser (22). Due to this configuration, the first pump mechanism (31a) sucks and compresses the outside air from which moisture has been removed while flowing from the outside to inside of the unit case (36) through the membrane filter (76) provided at the other end of the outside air passage (41). On the other hand, an outlet of the first pump mechanism (31a) is connected to one end of a discharge passage (42). The other end (downstream end) of the discharge passage (42) is divided into two branches, which are connected to the first and second directional control valves (32) and (33), respectively.

An inlet of the second pump mechanism (31b) is connected to one end of a suction passage (43). The other end (upstream end) of the suction passage (43) is divided into two branches, which are connected to the first and second directional control valves (32) and (33), respectively. An outlet of the second pump mechanism (31b) is connected to one end of a supply passage (44). The other end of the supply passage (44) opens in the secondary space (S22) on the blowout side of the internal fans (26) in the internal storage space (S2) of the container (11). The supply passage (44) is provided with a check valve (65) at the other end portion thereof. The check valve (65) allows the air to flow only from one end to the other end of the supply passage (44) and prevents backflow of the air.

The discharge passage (42) and the suction passage (43) are connected via a bypass passage (47). The bypass passage (47) is provided to perform an outside air introduction operation in which the outside air which has been taken into the air pump (31) is directly supplied into the container (11) by the pressure applied by the air pump (31). While the outside air introduction operation is performed, the bypass passage (47) guides the outside air which has been taken into the first pump mechanism (31a) of the air pump (31) to the inlet of the second pump mechanism (31b) with the first and second adsorption columns (34) and (35) bypassed. The bypass passage (47) is provided with a bypass on-off valve (48), an opening/closing operation of which is controlled by the controller (55). The controller (55) controls the opening/closing operation of the bypass on-off valve (48). The bypass on-off valve (48) is opened only during the outside air introduction operation, and is closed during the other operations.

The first and second pump mechanisms (31a) and (31b) of the air pump (31) are configured as oil-free pumps without lubricant oil. Two blower fans (49) are disposed on the side of the air pump (31) to cool the air pump (31) by blowing air toward the air pump (31).

(Directional Control Valve)

The first and second directional control valves (32) and (33) are provided in the air circuit (3) between the air pump (31) and the first and second adsorption columns (34) and (35), and are used to switch the connection between the air pump (31) and the first and second adsorption columns (34) and (35) among four connection states described later (first to fourth connection states). The controller (55) controls the switching.

Specifically, the first directional control valve (32) is connected to the discharge passage (42) connected to the outlet of the first pump mechanism (31a), the suction passage (43) connected to the inlet of the second pump mechanism (31b), and one end portion of the first adsorption column (34) (functioning as an inlet during pressurization). The first directional control valve (32) switches between a first state where the first adsorption column (34) is allowed to communicate with the outlet of the first pump mechanism (31a) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a) (the state shown in FIG. 5).

The second directional control valve (33) is connected to the discharge passage (42) connected to the outlet of the first pump mechanism (31a), the suction passage (43) connected to the inlet of the second pump mechanism (31b), and one end portion of the second adsorption column (35). The second directional control valve (33) switches between the first state where the second adsorption column (35) is allowed to communicate with the inlet of the second pump mechanism (31b) to be blocked from the outlet of the first pump mechanism (31a) (the state shown in FIG. 4), and the second state where the second adsorption column (35) is allowed to communicate with the outlet of the first pump mechanism (31a) to be blocked from the inlet of the second pump mechanism (31b) (the state shown in FIG. 5).

If the first and second directional control valves (32) and (33) are set to be in the first state, the air circuit (3) is switched to a first connection state where the outlet of the first pump mechanism (31a) is connected to the first adsorption column (34), and the inlet of the second pump mechanism (31b) is connected to the second adsorption column (35) (see FIG. 4). In this state, an adsorption operation is performed on the first adsorption column (34) to adsorb a nitrogen component in the outside air onto the adsorbent, and a desorption operation is performed on the second adsorption column (35) to desorb the nitrogen component adsorbed onto the adsorbent.

Figure 5:
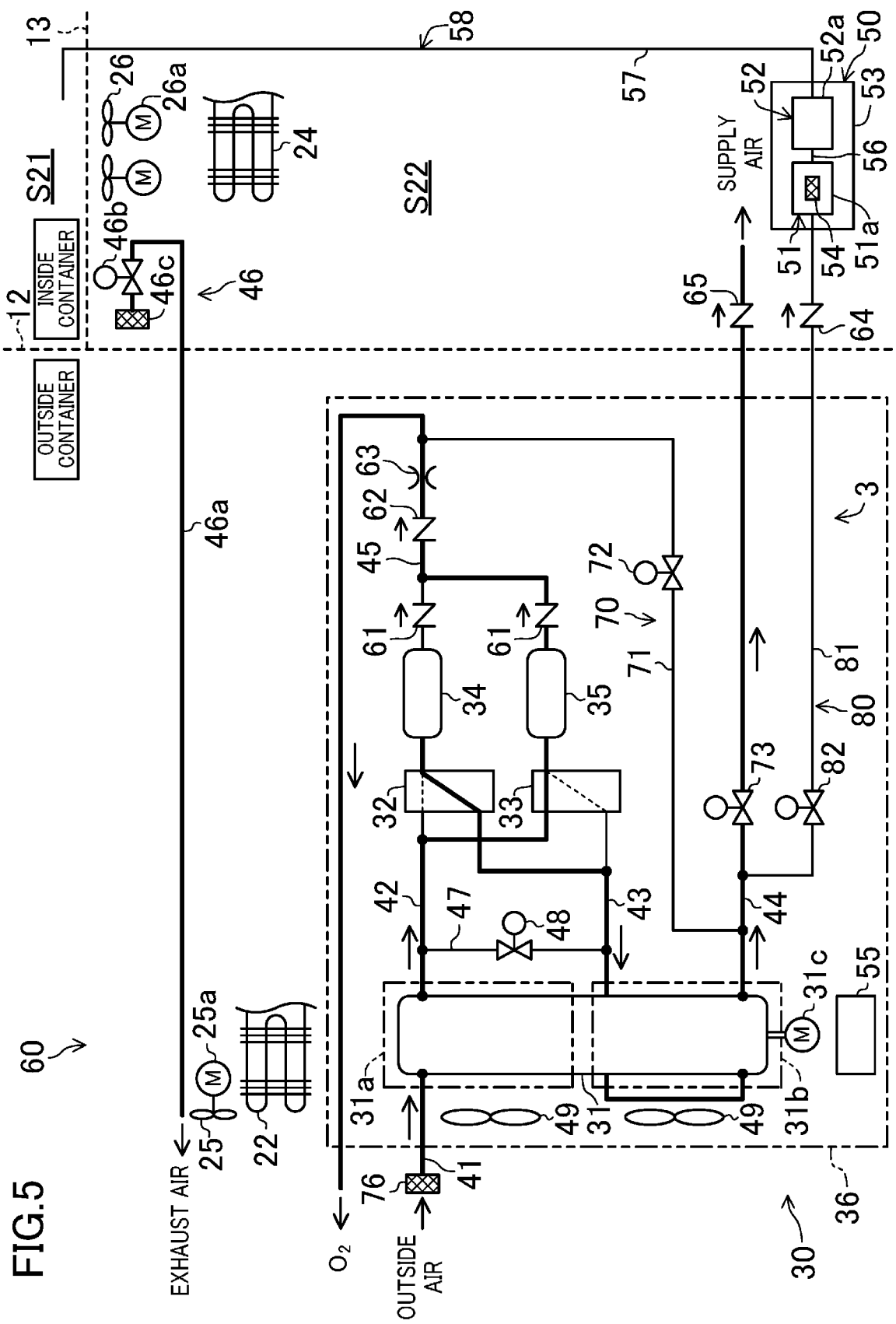
FIG. 5 is a piping diagram illustrating a configuration of the CA system of the embodiment, together with a flow of air during a second operation.

If the first and second directional control valves (32) and (33) are set to be in the second state, the air circuit (3) is switched to a second connection state where the outlet of the first pump mechanism (31a) is connected to the second adsorption column (35), and the inlet of the second pump mechanism (31b) is connected to the first adsorption column (34) (see FIG. 5). In this state, the adsorption operation is performed on the second adsorption column (35), and the desorption operation is performed on the first adsorption column (34).

Figure 6:
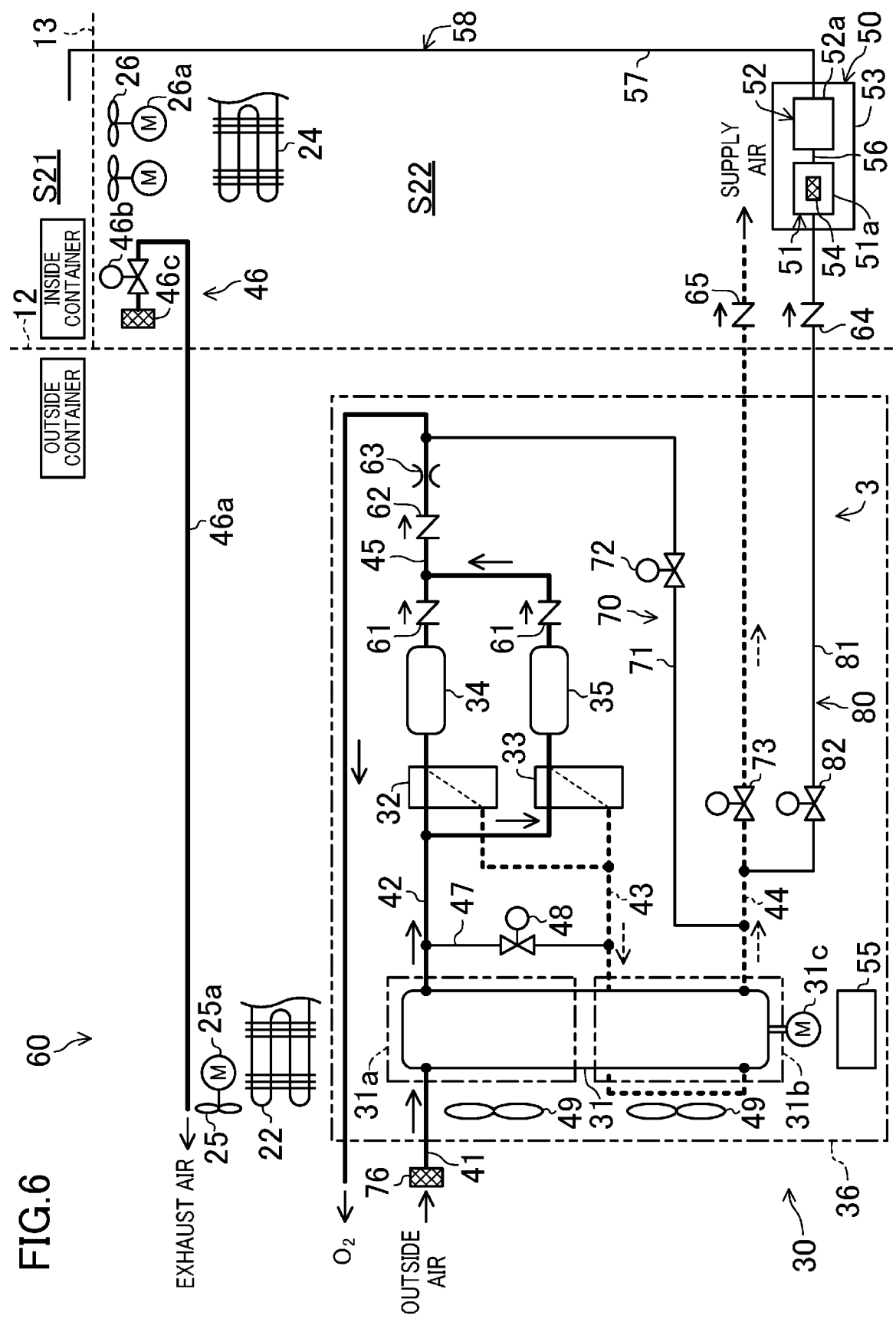
FIG. 6 is a piping diagram illustrating a configuration of the CA system of the embodiment, together with a flow of air during a pressure equalization operation.

If the first directional control valve (32) is set to be in the first state, and the second directional control valve (33) is set to be in the second state, the air circuit (3) is switched to a third connection state where the outlet of the first pump mechanism (31a) is connected to the first adsorption column (34), and the outlet of the first pump mechanism (31a) is connected to the second adsorption column (35) (see FIG. 6). In this state, both of the first and second adsorption columns (34) and (35) are connected to the outlet of the first pump mechanism (31a), and compressed outside air is supplied from the first pump mechanism (31a) to both of the first and second adsorption columns (34) and (35).

Figure 8:
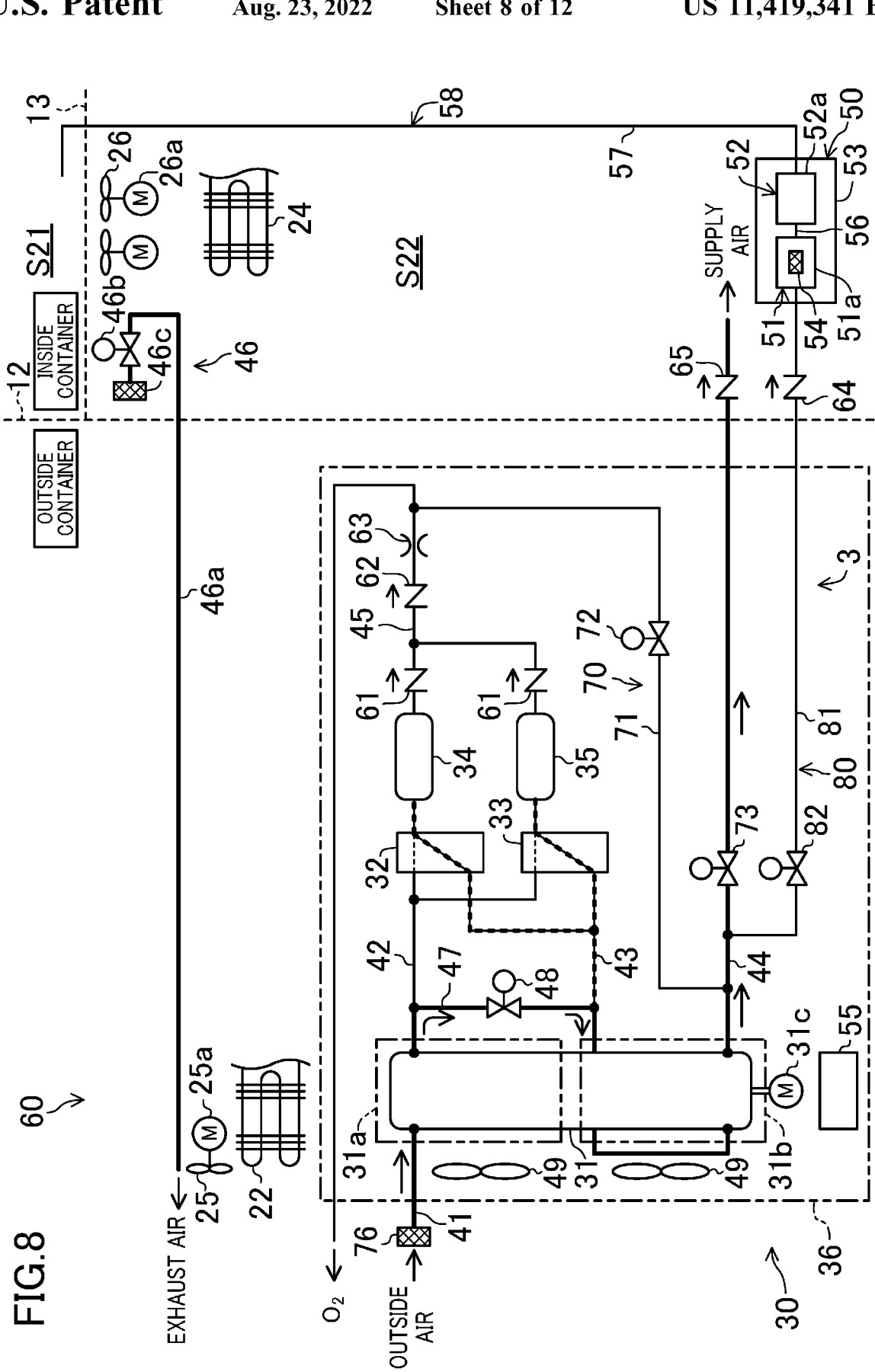
FIG. 8 is a piping diagram illustrating a configuration of the CA system of the embodiment, together with a flow of air during an outside air introduction operation.

If the first directional control valve (32) is set to be in the second state, and the second directional control valve (33) is set to be in the first state, the air circuit (3) is switched to a fourth connection state where the inlet of the second pump mechanism (31b) is connected to the first adsorption column (34), and the inlet of the second pump mechanism (31b) is connected to the second adsorption column (35) (see FIG. 8). In this state, both of the first and second adsorption columns (34) and (35) are connected to the inlet of the second pump mechanism (31b), and are blocked from the outlet of the first pump mechanism (31a).

(Adsorption Column)

The first and second adsorption columns (34) and (35) are configured as cylindrical members filled with an adsorbent. The adsorbent that fills the first and second adsorption columns (34) and (35) adsorbs a nitrogen component in a state where the adsorption columns (34, 35) are pressurized, and desorbs the nitrogen component in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. The nitrogen component in the air may be adsorbed using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with the nitrogen component as a result of the desorption operation. Consequently, low oxygen concentration air including moisture is supplied into the container (11), thus increasing the humidity in the container (11). Furthermore, the adsorbent is regenerated, which may extend the adsorbent's life.

In this configuration, if the air pump (31) supplies the compressed outside air to the first and second adsorption columns (34) and (35) to pressurize these columns (34) and (35), the nitrogen component in the outside air is adsorbed onto the adsorbent. This produces high oxygen concentration air that has had its nitrogen concentration lowered and oxygen concentration increased by including less nitrogen component than the outside air does. On the other hand, if the air pump (31) sucks the air from the first and second adsorption columns (34) and (35) to depressurize these columns (34) and (35), the nitrogen component adsorbed onto the adsorbent is desorbed. This produces low oxygen concentration air that has had its nitrogen concentration increased and oxygen concentration lowered by including more nitrogen component than the outside air does.

The respective other ends of the first and second adsorption columns (34) and (35) (functioning as outlets during pressurization) are connected to one end of an oxygen discharge passage (45) through which the high oxygen concentration air that has been produced in the first and second adsorption columns (34) and (35) from the compressed outside air supplied by the first pump mechanism (31a) is guided toward the outside of the container (11). The one end of the oxygen discharge passage (45) is divided into two branches, which are connected to the other ends of the first and second adsorption columns (34) and (35), respectively. The other end of the oxygen discharge passage (45) opens outside the gas supply device (30), i.e., outside the container (11). The branches of the oxygen discharge passage (45) are connected to the other ends of the first and second adsorption columns (34) and (35), respectively. Each of the junction portions is provided with a check valve (61) which prevents backflow of the air from the oxygen discharge passage (45) toward the first and second adsorption columns (34) and (35).

A check valve (62) and an orifice (63) are arranged at some midpoints of the oxygen discharge passage (45) so as to be sequentially arranged from one end to the other end of the oxygen discharge passage (45). The check valve (62) prevents backflow of the low oxygen concentration air from an exhaust connection passage (71), which will be described later, toward the first and second adsorption columns (34) and (35). The orifice (63) depressurizes the high oxygen concentration air which has flowed out of the first and second adsorption columns (34) and (35) before the high oxygen concentration air is discharged to the outside of the container.

(Supply-Discharge Switching Mechanism)

The air circuit (3) is provided with a supply-discharge switching mechanism (70) which switches between a gas supply operation, which will be described later (see FIGS. 4 and 5), of supplying the produced low oxygen concentration air into the container (11), and a gas discharge operation (see FIG. 7) of discharging the produced low oxygen concentration air to the outside of the container (11). The supply-discharge switching mechanism (70) includes an exhaust connection passage (71), an exhaust on-off valve (72), and a supply on-off valve (73).

The exhaust connection passage (71) has one end connected to the supply passage (44), and the other end connected to the oxygen discharge passage (45). The other end of the exhaust connection passage (71) is connected to the oxygen discharge passage (45) so as to be located further toward the outside of the container than the orifice (63).

The exhaust on-off valve (72) is provided for the exhaust connection passage (71). The exhaust on-off valve (72) is provided at a midpoint of the exhaust connection passage (71), and is comprised of a solenoid valve which is switched between an open state where the flow of the low oxygen concentration air from the supply passage (44) is allowed, and a closed state where the flow of the low oxygen concentration air is blocked. The controller (55) controls an opening/closing operation of the exhaust on-off valve (72).

The supply on-off valve (73) is provided for the supply passage (44) so as to be located further toward the other end (toward the inside of the container) than the junction where the exhaust connection passage (71) is connected to the supply passage (44). The supply on-off valve (73), which is located further toward the inside of the container than the junction between the supply passage (44) and the exhaust connection passage (71), is comprised of a solenoid valve which is switched between an open state where the flow of the low oxygen concentration air toward the inside of the container is allowed, and a closed state where the flow of the low oxygen concentration air toward the inside of the container is blocked. The controller (55) controls an opening/closing operation of the supply on-off valve (73).

The supply-discharge switching mechanism (70) allows the gas supply device (30) to vary the oxygen concentration in the low oxygen concentration air supplied into the container (11) among a plurality of levels. Note that in this embodiment, the gas supply device (30) is configured to be able to vary the oxygen concentration in the low oxygen concentration air supplied into the container (11) between two levels (an oxygen concentration of 5% and an oxygen concentration of 8%). In other words, the gas supply device (30) of this embodiment selectively produces first low oxygen concentration air having an oxygen concentration of 8% and second low oxygen concentration air having an oxygen concentration of 5%.

(Measurement Unit)

The air circuit (3) is provided with a measurement unit (80) for performing a supply air measurement operation to measure the concentration of the produced low oxygen concentration air using an oxygen sensor (51) of the sensor unit (50), which will be described later, provided inside the container (11). The measurement unit (80) includes a branch pipe (a measurement passage) (81) and a measurement on-off valve (82), and allows part of the low oxygen concentration air flowing through the supply passage (44) to be diverged toward the oxygen sensor (51).

Specifically, the branch pipe (81) has one end connected to the supply passage (44), and the other end coupled to an oxygen sensor box (51a), which will be described later, of the oxygen sensor (51). In this embodiment, the branch pipe (81) is branched from the supply passage (44) in the unit case (36) and extends from the interior to exterior of the unit case (36). The branch pipe (81) is provided with a check valve (64) at the other end portion thereof. The check valve (64) allows the air to flow only from one end to the other end of the branch pipe (81) and prevents backflow of the air.

The measurement on-off valve (82) is provided for the branch pipe (81) in the unit case. The measurement on-off valve (82) is comprised of a solenoid valve which switches between an open state where the flow of the low oxygen concentration air in the branch pipe (81) is allowed, and a closed state where the flow of the low oxygen concentration air in the branch pipe (81) is blocked. The controller (55) controls an opening/closing operation of the measurement on-off valve (82). As will be described in detail later, the measurement on-off valve (82) is open only when a supply air measurement operation to be described later is performed, and is closed in the other modes.

—Operation of Gas Supply Device—

(Gas Production Operation)

The gas supply device (30) alternately repeats a first operation (see FIG. 4) in which the first adsorption column (34) is pressurized and the second adsorption column (35) is depressurized simultaneously, and a second operation (see FIG. 5) in which the first adsorption column (34) is depressurized and the second adsorption column (35) is pressurized simultaneously every predetermined time (e.g., 14.5 seconds) so as to produce the low oxygen concentration air and the high oxygen concentration air. In this embodiment, a pressure equalization operation (see FIG. 6) in which both of the first and second adsorption columns (34) and (35) are pressurized is performed for a predetermined time (e.g., 1.5 seconds) between the first and second operations (see FIG. 9). The controller (55) controls the first and second directional control valves (32) and (33) to perform the switching among these operations.

<<First Operation>>

During the first operation, the controller (55) switches the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a).

The first pump mechanism (31a) supplies the compressed outside air to the first adsorption column (34). A nitrogen component contained in the air that has flowed into the first adsorption column (34) is adsorbed on the adsorbent of the first adsorption column (34). Thus, during the first operation, the first pump mechanism (31a) supplies the compressed outside air to the first adsorption column (34), in which the adsorbent adsorbs the nitrogen component in the outside air. As a result, high oxygen concentration air having a lower nitrogen concentration and a higher oxygen concentration than the outside air is produced. The high oxygen concentration air flows from the first adsorption column (34) to the oxygen discharge passage (45).

On the other hand, the second pump mechanism (31b) sucks the air from the second adsorption column (35). Simultaneously, the second pump mechanism (31b) also sucks the nitrogen component that has been adsorbed onto the adsorbent in the second adsorption column (35) together with the air, thereby allowing the adsorbent to desorb the nitrogen component. Thus, during the first operation, the second pump mechanism (31b) sucks the air out of the second adsorption column (35) to allow the adsorbent to desorb the nitrogen component adsorbed thereon. This produces low oxygen concentration air containing the nitrogen component desorbed from the adsorbent, and having a higher nitrogen concentration and a lower oxygen concentration than the outside air. The low oxygen concentration air is sucked into the second pump mechanism (31b), compressed, and discharged toward the supply passage (44).

<<Second Operation>>

During the second operation, the controller (55) switches the first and second directional control valves (32) and (33) to the second state shown in FIG. 5. Thus, the air circuit (3) is set to the second connection state in which the first adsorption column (34) communicates with the inlet of the second pump mechanism (31b) and is blocked from the outlet of the first pump mechanism (31a), and simultaneously, the second adsorption column (35) communicates with the outlet of the first pump mechanism (31a) and is blocked from the inlet of the second pump mechanism (31b).

The first pump mechanism (31a) supplies the compressed outside air to the second adsorption column (35). A nitrogen component contained in the air that has flowed into the second adsorption column (35) is adsorbed on the adsorbent of the second adsorption column (35). Thus, during the second operation, the first pump mechanism (31a) supplies the compressed outside air to the second adsorption column (35), in which the adsorbent adsorbs the nitrogen component in the outside air. As a result, high oxygen concentration air having a lower nitrogen concentration and a higher oxygen concentration than the outside air is produced. The high oxygen concentration air flows out from the second adsorption column (35) to the oxygen discharge passage (45).

On the other hand, the second pump mechanism (31b) sucks the air from the first adsorption column (34). Simultaneously, the second pump mechanism (31b) also sucks the nitrogen component that has been adsorbed onto the adsorbent in the first adsorption column (34) together with the air, thereby allowing the adsorbent to desorb the nitrogen component. Thus, during the second operation, the second pump mechanism (31b) sucks the air out of the first adsorption column (34) to allow the adsorbent to desorb the nitrogen component adsorbed thereon. This produces low oxygen concentration air containing the nitrogen component desorbed from the adsorbent, and having a higher nitrogen concentration and a lower oxygen concentration than the outside air. The low oxygen concentration air is sucked into the second pump mechanism (31b), compressed, and discharged toward the supply passage (44).

«Pressure Equalization Operation»

As illustrated in FIG. 6, in the pressure equalization operation, the controller (55) switches the first directional control valve (32) to the first state, and the second directional control valve (33) to the second state. Thus, the air circuit (3) is set to the third connection state where both of the first and second adsorption columns (34) and (35) communicate with the outlet of the first pump mechanism (31a) and are blocked from the inlet of the second pump mechanism (31b).

The first pump mechanism (31a) supplies the compressed outside air to both of the first and second adsorption columns (34) and (35). The nitrogen component contained in the compressed air which has flowed into the first and second adsorption columns (34) and (35) is adsorbed onto the adsorbent in each of the columns (34) and (35), and the high oxygen concentration air is produced. The high oxygen concentration air flows from the first and second adsorption columns (34) and (35) to the oxygen discharge passage (45).

On the other hand, the second pump mechanism (31b) is blocked from the first and second adsorption columns (34) and (35). Thus, in the pressure equalization operation, no further low oxygen concentration air is produced in the first and second adsorption columns (34) and (35). The second pump mechanism (31b) sucks and compresses the low oxygen concentration air remaining in the suction passage (43), and discharges the compressed low oxygen concentration air into the supply passage (44).

As mentioned above, during the first operation, the first adsorption column (34) is pressurized by the first pump mechanism (31a) to perform the adsorption operation, whereas the second adsorption column (35) is depressurized by the second pump mechanism (31b) to perform the desorption operation. During the second operation, the second adsorption column (35) is pressurized by the first pump mechanism (31a) to perform the adsorption operation, whereas the first adsorption column (34) is depressurized by the second pump mechanism (31b) to perform the desorption operation. Thus, when the first operation is switched to the second operation or the second operation is switched to the first operation without the pressure equalization operation performed between the first and second operations, the pressure in the adsorption column where the desorption operation has been performed before the switching is remarkably low right after the switching. Thus, it takes time until the pressure in this adsorption column increases, and the adsorption operation does not start soon.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). Due to this configuration, the inner pressures of the first and second adsorption columns (34) and (35) are immediately equalized (i.e., become intermediate pressures between the respective inner pressures). The pressure equalization operation immediately increases the pressure in the adsorption column which has been depressurized by the second pump mechanism (31b) and performing the desorption operation before the switching. Thus, the adsorption operation is performed immediately after the connection with the first pump mechanism (31a).

In this manner, the gas supply device (30) alternately repeats the first and second operations, with the pressure equalization operation performed between the first and second operations, thereby producing the low oxygen concentration air and the high oxygen concentration air in the air circuit (3).

(Gas Supply Operation/Gas Discharge Operation)

The supply-discharge switching mechanism (70) switches the gas supply device (30) between a gas supply operation in which the low oxygen concentration air produced in the air circuit (3) is supplied into the container (11), and a gas discharge operation in which the produced low oxygen concentration air is not supplied into, but discharged to the outside of, the container (11) for a predetermined time since the desorption operation was started.

«Gas Supply Operation»

During the gas supply operation, as shown in FIGS. 4 to 6, the controller (55) closes the exhaust on-off valve (72), and opens the supply on-off valve (73). As a result, the low oxygen concentration air produced alternately in the first and second adsorption columns (34) and (35) is supplied into the container (11) through the supply passage (44), and the high oxygen concentration air is discharged to the outside of the container through the oxygen discharge passage (45).

«Gas Discharge Operation»

Figure 7:
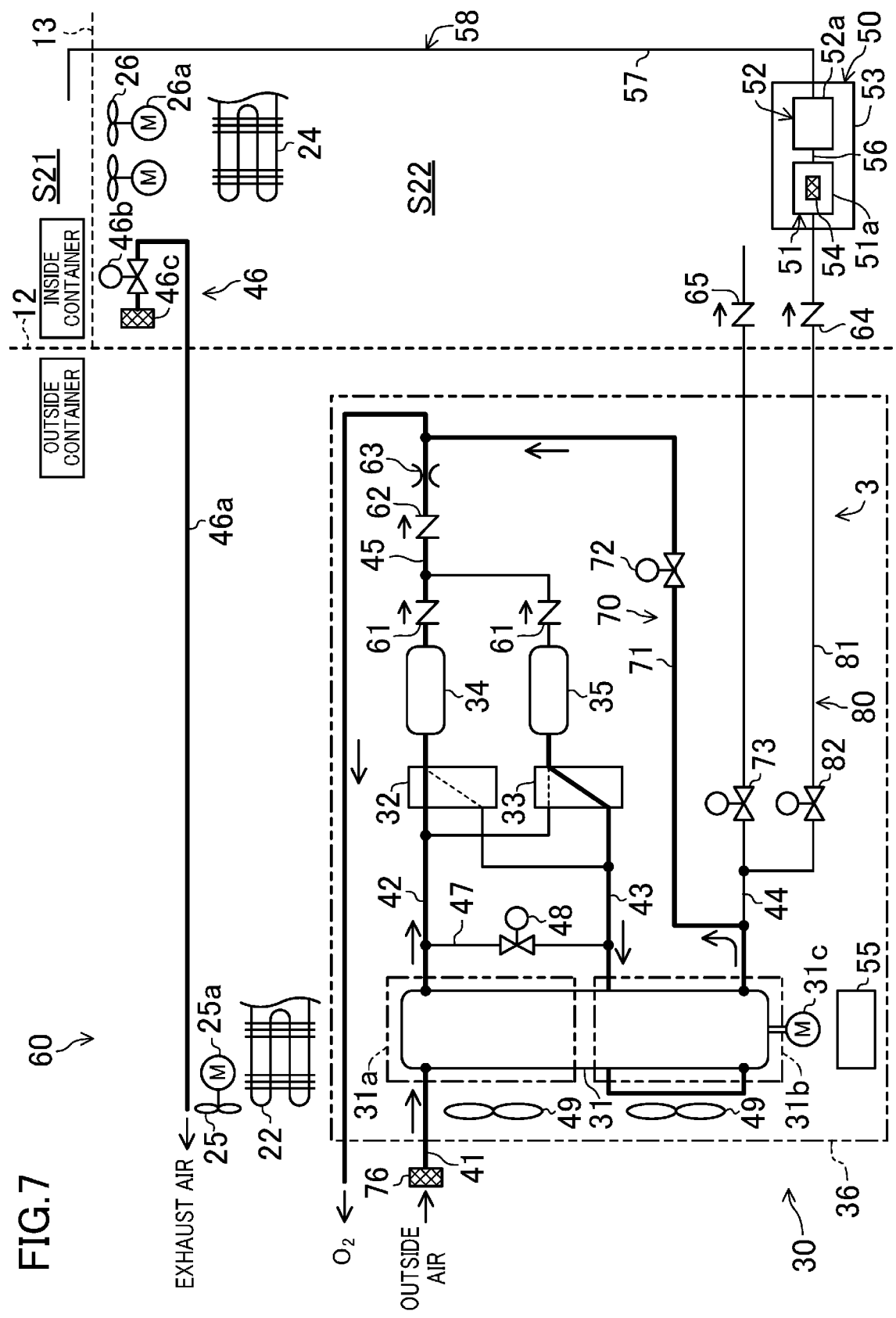
FIG. 7 is a piping diagram illustrating a configuration of the CA system of the embodiment, together with a flow of air during a gas exhaust operation.

During the gas discharge operation, as shown in FIG. 7, the controller (55) opens the exhaust on-off valve (72), and closes the supply on-off valve (73). As a result, the low oxygen concentration air produced alternately in the first and second adsorption columns (34) and (35) is not allowed to flow further toward the inside of the container (11) than the supply on-off valve (73) in the supply passage (44), and flows into the exhaust connection passage (71). The low oxygen concentration air that has flowed into the exhaust connection passage (71) flows into the oxygen discharge passage (45), and is discharged to the outside of the container together with the high oxygen concentration air flowing through the oxygen discharge passage (45).

(Operation Modes of Gas Supply Device)

The gas supply device (30) is configured to be capable of operating in four operation modes. Specifically, the gas supply device (30) is configured to be capable of operating in an oxygen concentration 5% mode, an oxygen concentration 8% mode, an outside air introduction mode, and a breathing mode.

The oxygen concentration 5% mode is an operation mode in which the gas supply device (30) supplies low oxygen concentration air (second low oxygen concentration air) having a mean oxygen concentration of 5% into the container (11). The oxygen concentration 8% mode is an operation mode in which the gas supply device (30) supplies low oxygen concentration air (first low oxygen concentration air) having a mean oxygen concentration of 8% into the container (11). The outside air introduction mode is an operation mode in which the gas supply device (30) supplies air outside the container (11) (outside air) directly into the container (11). The breathing mode is an operation mode in which the gas supply device (30) stops supplying the low oxygen concentration air and the outside air into the container (11) in order to allow breathing of the plants (15) inside the container to change the composition of the air inside the container.

The oxygen concentration of the gas supplied into the container increases in the following order of the operation modes in which the gas supply device (30) operates: the oxygen concentration 5% mode; the oxygen concentration 8% mode; and the outside air introduction mode (5%→8%→21%). Meanwhile, the amount of the gas supplied also increases. The gas supply device (30) is configured to be switchable among such operation modes, so as to be capable of varying the oxygen concentration of the low oxygen concentration air supplied into the container among a plurality of levels, and to increase the amount of the gas supplied as the oxygen concentration of the gas supplied into the container increases. These operation modes will now be described in detail.

«Oxygen Concentration 5% Mode»

The oxygen concentration 5% mode corresponds to a second supply operation in which low oxygen concentration air (second low oxygen concentration air) having a mean oxygen concentration of 5% is supplied into the container (11). In the oxygen concentration 5% mode, the controller (55) alternately repeats the first and second operations, with the pressure equalization operation performed during intervals between the first and second operations, by switching the first and second directional control valves (32) and (33) as shown in FIGS. 4 to 6 and 10, thereby producing low oxygen concentration air having a higher nitrogen concentration and lower oxygen concentration than the outside air (gas production operation). In this embodiment, the operational time of the first and second operations is set to be 14.5 seconds each, and the operational time of the pressure equalization operation is set to be 1.5 seconds.

Note that in each of the first and second operations, the low oxygen concentration air produced in an initial stage of the operation and the low oxygen concentration air produced in a terminal stage of the operation have different compositions. Specifically, in the initial stage of each operation, the low oxygen concentration air having a relatively high oxygen concentration is produced because the outside air still remains in the adsorption columns and the pipes. In the terminal stage of each operation, the low oxygen concentration air having a relatively low oxygen concentration is produced because the pressure in the adsorption columns becomes lower than that in the initial stage, and more nitrogen component is desorbed.

In the oxygen concentration 5% mode, the controller (55) instructs the exhaust on-off valve (72) to open and the supply on-off valve (73) to close as shown in FIGS. 7 and 10 for a predetermined time in the initial stage of the first and second operations (4 seconds from the start of each operation in this embodiment) to allow the gas supply device (30) to perform the gas discharge operation without performing the gas supply operation. In other words, out of the low oxygen concentration air produced by the gas production operation, low oxygen concentration air having a relatively high oxygen concentration is not supplied into, but discharged to the outside of, the container (11).

Then, the controller (55) instructs the exhaust on-off valve (72) to close and the supply on-off valve (73) to open after the predetermined time (after the end of the gas discharge operation) to allow the gas supply device (30) to perform the gas supply operation. In other words, out of the low oxygen concentration air produced by the gas production operation, low oxygen concentration air having a relatively low oxygen concentration is supplied into the container (11).

In the oxygen concentration 5% mode, as described above, the gas supply device (30) intermittently performs the gas supply operation at the timing when the low oxygen concentration air having a relatively low oxygen concentration is produced by the gas production operation. As a result, only the low oxygen concentration air having a relatively low oxygen concentration is supplied into the container (11). Specifically, in the oxygen concentration 5% mode, the low oxygen concentration air having a mean nitrogen concentration of 95% (i.e., a mean value of the nitrogen concentration of the low oxygen concentration air supplied into the container in each of the first and second operations) and a mean oxygen concentration of 5% (i.e., a mean value of the oxygen concentration of the low oxygen concentration air supplied into the container in each of the first and second operations) is supplied into the container (11). The carbon dioxide concentration of the low oxygen concentration air produced in the oxygen concentration 5% mode is substantially equal to the carbon dioxide concentration (0.03%) of the outside air.

«Oxygen Concentration 8% Mode»

The oxygen concentration 8% mode corresponds to a first supply operation in which low oxygen concentration air (first low oxygen concentration air) having a mean oxygen concentration of 8% is supplied into the container (11). In the oxygen concentration 8% mode, just like the oxygen concentration 5% mode, the controller (55) alternately repeats the first and second operations, with the pressure equalization operation performed during intervals between the first and second operations, by switching the first and second directional control valves (32) and (33) as shown in FIG. 11, thereby producing low oxygen concentration air having a higher nitrogen concentration and lower oxygen concentration than the outside air.

In the oxygen concentration 8% mode, the controller (55) instructs the exhaust on-off valve (72) to close and the supply on-off valve (73) to open as shown in FIGS. 4 to 6 and 11 to allow the gas supply device (30) to perform the gas supply operation. In other words, the low oxygen concentration air produced by the gas production operation is supplied into the container (11).

Note that in the oxygen concentration 8% mode, the gas discharge operation is not performed unlike the oxygen concentration 5% mode, and the gas supply operation is always performed. In other words, in the oxygen concentration 8% mode, the whole low oxygen concentration air produced (the whole low oxygen concentration air including the low oxygen concentration air having a relatively high oxygen concentration and the low oxygen concentration air having a relatively low oxygen concentration) is supplied into the container (11) in each of the first and second operations. Thus, in the oxygen concentration 8% mode, the low oxygen concentration air having a higher oxygen concentration than the low oxygen concentration air supplied into the container (11) in the oxygen concentration 5% mode and having a mean nitrogen concentration of 92% and a mean oxygen concentration of 8% is supplied into the container (11). The carbon dioxide concentration of the low oxygen concentration air produced in the oxygen concentration 8% mode is substantially equal to the carbon dioxide concentration (0.03%) of the outside air.

In the oxygen concentration 8% mode, the gas discharge operation is not performed unlike the oxygen concentration 5% mode, and the whole low oxygen concentration air produced by the gas production operation is supplied into the container (11). This allows the amount of the low oxygen concentration air supplied into the container (gas supply amount) to be larger than that in the oxygen concentration 5% mode.

«Outside Air Introduction Mode»

The outside air introduction mode corresponds to an outside air supply operation in which air outside the container (11) (outside air) is directly supplied into the container (11). As illustrated in FIG. 8, in the outside air introduction mode, the controller (55) switches the first directional control valve (32) to the second state, and the second directional control valve (33) to the first state. Thus, the air circuit (3) is set to the fourth connection state where both of the first and second adsorption columns (34) and (35) are blocked from the outlet of the first pump mechanism (31a) and communicate with the inlet of the second pump mechanism (31b). In the outside air introduction mode, the controller (55) instructs the bypass on-off valve (48) to open.

Under the control described above, the first pump mechanism (31a) is blocked from the first and second adsorption columns (34) and (35). Thus, the outside air sucked into, and compressed by, the first pump mechanism (31a) of the air pump (31) flows into the bypass passage (47) from the discharge passage (42) without flowing into the first and second adsorption columns (34) and (35). The outside air that has flowed into the bypass passage (47) flows through the suction passage (43), and is sucked into the second pump mechanism (31b). The second pump mechanism (31b) compresses the sucked outside air, and discharges the compressed outside air to the supply passage (44). In this manner, in the outside air introduction mode, the outside air which has been sucked into the air pump (31) is directly supplied into the container (11) by the pressure applied by the air pump (31).

In the outside air introduction mode, the whole outside air which has been taken into the gas supply device (30) is introduced into the container (11). Thus, the amount of the gas supplied into the container is larger than that in the gas supply operation (the oxygen concentration 8% mode and the oxygen concentration 5% mode) in which, out of the low oxygen concentration air and the high oxygen concentration air produced from the outside air, the high oxygen concentration air is discharged to the outside of the container, and only the low oxygen concentration air is supplied into the container.

«Breathing Mode»

The breathing mode corresponds to a standby operation in which the gas supply device (30) stops supplying the low oxygen concentration air and the outside air into the container (11) in order to use breathing of the plants (15) inside the container to change the composition of the inside air. In the breathing mode, the air pump (31) stops, and the exhaust on-off valve (72) is closed. In the breathing mode, the measurement on-off valve (82) is closed to use the sensor unit (50), which will be described later, to measure the oxygen concentration and carbon dioxide concentration of the inside air. Note that, in the breathing mode, the gas supply device (30) is not completely stopped, but waits in a state where the gas supply device (30) can start upon receipt of a command from the controller (55).

[Exhaust Portion]

—Configuration of Exhaust Portion—

As shown in FIG. 2, the exhaust portion (46) includes an exhaust passage (46a) connecting the internal storage space (S2) and the external space of the container together, and an exhaust valve (46b) connected to the exhaust passage (46a). A membrane filter (46c) is provided at the inlet end (toward the inside of the container) of the exhaust passage (46a). The exhaust passage (46a) passes through the casing (12) from the interior to exterior of the casing (12). The exhaust valve (46b) is provided adjacent to an internal end of the exhaust passage (46a), and is comprised of an electromagnetic valve which is switched between an open state where the flow of the air in the exhaust passage (46a) is allowed, and a closed state where the flow of the air in the exhaust passage (46a) is blocked. The controller (55) controls an opening/closing operation of the exhaust valve (46b).

—Operation of Exhaust Portion—

When the internal fans (26) are rotating, an exhaust operation is performed. That is, the controller (55) opens the exhaust valve (46b) to discharge the air (inside air) in the internal storage space (S2) communicating with the interior of the container to the outside of the container.

Specifically, when the internal fans (26) are rotating, the pressure of the secondary space (S22) on the blowout side becomes higher than the pressure of the external space of the container (i.e., the atmospheric pressure). In addition, the gas supply device (30) supplying the low oxygen concentration air or the outside air into the container (11) also allows the air pressure inside the container (11) (the pressure of the inside air) to be higher than the pressure of the external space of the container (i.e., the atmospheric pressure). Thus, when the exhaust valve (46b) is open, the air pressure at the inlet end of the exhaust passage (46a) is higher than that at the outlet end of the exhaust passage (46a), and due to the pressure difference between the ends of the exhaust passage (46a) (the pressure difference between the external space of the container and the secondary space (S22)), the air in the internal storage space (S2) communicating with the interior of the container (inside air) is discharged to the outside of the container via the exhaust passage (46a).

[Sensor Unit]

—Configuration of Sensor Unit—

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51a) housing a galvanic-cell sensor therein. The oxygen sensor (51) measures the value of a current flowing through an electrolytic solution of the galvanic-cell sensor to measure the oxygen concentration of a gas in the oxygen sensor box (51a). The oxygen sensor box (51a) is fixed to the fixing member (53). An outer surface of the oxygen sensor box (51a) has an opening, to which the membrane filter (54), which is air-permeable and waterproof, is attached. In addition, one end of the connection pipe (56) is coupled to the oxygen sensor box (51a). Further, a branch pipe (81) of the measurement unit (80) described above is coupled to the oxygen sensor box (51a).

The carbon dioxide sensor (52) has a carbon dioxide sensor box (52a). The carbon dioxide sensor (52) is a non-dispersive infrared (NDIR) sensor which radiates infrared rays to the gas in the carbon dioxide sensor box (52a) to measure an absorption amount of infrared rays having a wavelength specific to carbon dioxide, thereby measuring the carbon dioxide concentration in the gas. The other end of the connection pipe (56) is coupled to the carbon dioxide sensor box (52a). Furthermore, one end of the exhaust pipe (57) is coupled to the carbon dioxide sensor box (52a).

The fixing member (53) is fixed to the casing (12) with the oxygen sensor (51) and the carbon dioxide sensor (52) attached thereto.

The connection pipe (56) is, as described above, coupled to the oxygen sensor box (51a) and the carbon dioxide sensor box (52a), and allows the internal space of the oxygen sensor box (51a) to communicate with the internal space of the carbon dioxide sensor box (52a).

As described above, the exhaust pipe (57) has one end coupled to the carbon dioxide sensor box (52a), and the other end open near the suction port of the internal fans (26). That is, the exhaust pipe (57) allows the internal space of the carbon dioxide sensor box (52a) to communicate with the primary space (S21) of the internal storage space (S2).

—Concentration Measurement Operation—

As can be seen, the secondary and primary spaces (S22) and (S21) of the internal storage space (S2) communicate with each other via an air passage (58) formed by the membrane filter (54), the internal space of the oxygen sensor box (51a), the connection pipe (56), the internal space of the carbon dioxide sensor box (52a), and the exhaust pipe (57). Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor (52) are connected. Thus, the inside air sequentially flows through the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Controller]

The controller (55) is configured to control the operation of the gas supply device (30) and the exhaust portion (46) so that the composition of the air in the container (11) will be a desired composition. Specifically, the controller (55) controls the operation of the gas supply device (30) and the exhaust portion (46) based on measurement values obtained by the oxygen sensor (51) and the carbon dioxide sensor (52) so that the oxygen concentration and carbon dioxide concentration of the air in the container (11) are controlled to respective set values.

The controller (55) controls the action of the CA system (60) to instruct the CA system (60) to perform an oxygen concentration reduction action and an air composition maintenance action. In the air composition maintenance action of the CA system (60), the controller (55) instructs the gas supply device (30) to operate while switching among the oxygen concentration 8% mode corresponding to the first supply operation, the oxygen concentration 5% mode corresponding to the second supply operation, the outside air introduction mode corresponding to the outside air supply operation, and the breathing mode corresponding to the standby operation, so that the composition of the air in the container (11) will be a desired composition. A control operation performed by the controller (55) will be described later.

The controller (55) of this embodiment includes a microcomputer which executes a control program for controlling various components of the CA system (60) in such a manner as disclosed in this application, and a memory which stores control programs, data and other elements which are used to execute such a control program. Note that the controller (55) is an example of a controller of the CA system (60), and a detailed structure and algorithm of the controller (55) may be comprised of a combination of any kind of hardware and software that can implement the functions disclosed in this application.

—Operation of Container Refrigeration Apparatus—

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows a refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the container (11) via the blowout port (18b). Thus, the air in the container (11) is cooled.

—Operation of CA System—

The CA system (60) performs the oxygen concentration reduction action and the air composition maintenance action so that the composition of the air in the container (11) will be a desired composition. The oxygen concentration reduction action is performed to reduce the oxygen concentration of the air in the container if the oxygen concentration of the air in the container is higher than a set oxygen concentration by a predetermined value (e.g., 1%) or more. The air composition maintenance action is performed to maintain the oxygen concentration and carbon dioxide concentration of the air in the container at the respective set values after the oxygen concentration of the air in the container has decreased to the set oxygen concentration to terminate the oxygen concentration reduction action.

If, while the CA system (60) is performing the oxygen concentration reduction action, a measurement value MV_O2 of the oxygen concentration of the air in the container decreases to a set oxygen concentration SP_O2, the controller (55) of this embodiment instructs the CA system (60) to terminate the oxygen concentration reduction action and perform the air composition maintenance action. If "MV_O2>SP_O2+1%" during the air composition maintenance action, the controller (55) switches the action of the CA system (60) from the air composition maintenance action to the oxygen concentration reduction action. Thereafter, if "MV_O2≤SP_O2," the controller (55) again switches the action of the CA system (60) from the oxygen concentration reduction action to the air composition maintenance action.

While the oxygen concentration reduction action and the air composition maintenance action are being performed, the controller (55) instructs the measurement on-off valve (82) to be closed, and communicates with the unit controller (100) to rotate the internal fans (26), which circulate the inside air between the interior of the container and the internal storage space (S2). In this state, the air in the container (11) is supplied to the sensor unit (50). Thus, the oxygen sensor (51) measures the oxygen concentration of the air in the container (11), and the carbon dioxide sensor (52) measures the carbon dioxide concentration of the air in the container (11). While the oxygen concentration reduction action and the air composition maintenance action are being performed, the controller (55) reads a measurement value measured by the oxygen sensor (51) as the measurement value MV_O2 of the oxygen concentration of the inside air, and reads a measurement value measured by the carbon dioxide sensor (52) as the measurement value MV_CO2 of the carbon dioxide concentration of the inside air.

<Oxygen Concentration Reduction Action>

At the point in time when an operation for storing the plants (15) boxed in the container (11) is completed, and a door of the container (11) is closed, the composition of the air in the container (11) is substantially equal to the composition of air outside the container (11). Thus, under normal conditions, the CA system (60) initially performs the oxygen concentration reduction action.

In the oxygen concentration reduction action of the CA system (60), the gas supply device (30) mainly operates in the oxygen concentration 5% mode. In the oxygen concentration 5% mode of the gas supply device (30), low oxygen concentration air (second low oxygen concentration air) having a mean oxygen concentration of 5% is supplied into the container (11). In addition, in the oxygen concentration reduction action of the CA system (60), the exhaust valve (46b) of the exhaust portion (46) is open. Note that in the oxygen concentration reduction action of the CA system (60), the gas supply device (30) may operate in the oxygen concentration 8% mode and the outside air introduction mode as necessary.

If the gas supply device (30) supplies the low oxygen concentration air into the container (11), an amount of inside air equivalent to the amount of the low oxygen concentration air supplied is discharged through the exhaust passage (46a) of the exhaust portion (46) to the outside of the container (11). Then, the air present in the container (11) is gradually replaced with the low oxygen concentration air supplied by the gas supply device (30). As a result, the oxygen concentration of the air in the container (11) gradually decreases. If, during the oxygen concentration reduction action, the measurement value MV_O2 of the oxygen concentration of the air in the container is less than or equal to the set oxygen concentration SP_O2 (MV_O2≤SP_O2), the controller (55) instructs the CA system (60) to terminate the oxygen concentration reduction action and start the air composition maintenance action.

<Air Composition Maintenance Action>

When the oxygen concentration reduction action is completed, the air composition maintenance action is started. In the air composition maintenance action of the CA system (60), the controller (55) instructs the gas supply device (30) to operate while switching among the oxygen concentration 5% mode, the oxygen concentration 8% mode, the outside air introduction mode, and the breathing mode, so that the measurement value MV_O2 of the oxygen concentration of the air in the container will be the set oxygen concentration SP_O2 and the measurement value MV_CO2 of the carbon dioxide concentration of the air in the container will be the set carbon dioxide concentration SP_CO2.

In addition, in the air composition maintenance action of the CA system (60), the controller (55) acts to operate the exhaust valve (46b) of the exhaust portion (46). Specifically, if the gas supply device (30) operates in any one of the oxygen concentration 5% mode, the oxygen concentration 8% mode, and the outside air introduction mode, the controller (55) instructs the exhaust valve (46b) to open. If the gas supply device (30) operates in the breathing mode, the controller (55) instructs the exhaust valve (46b) to be closed.

Figure 12:
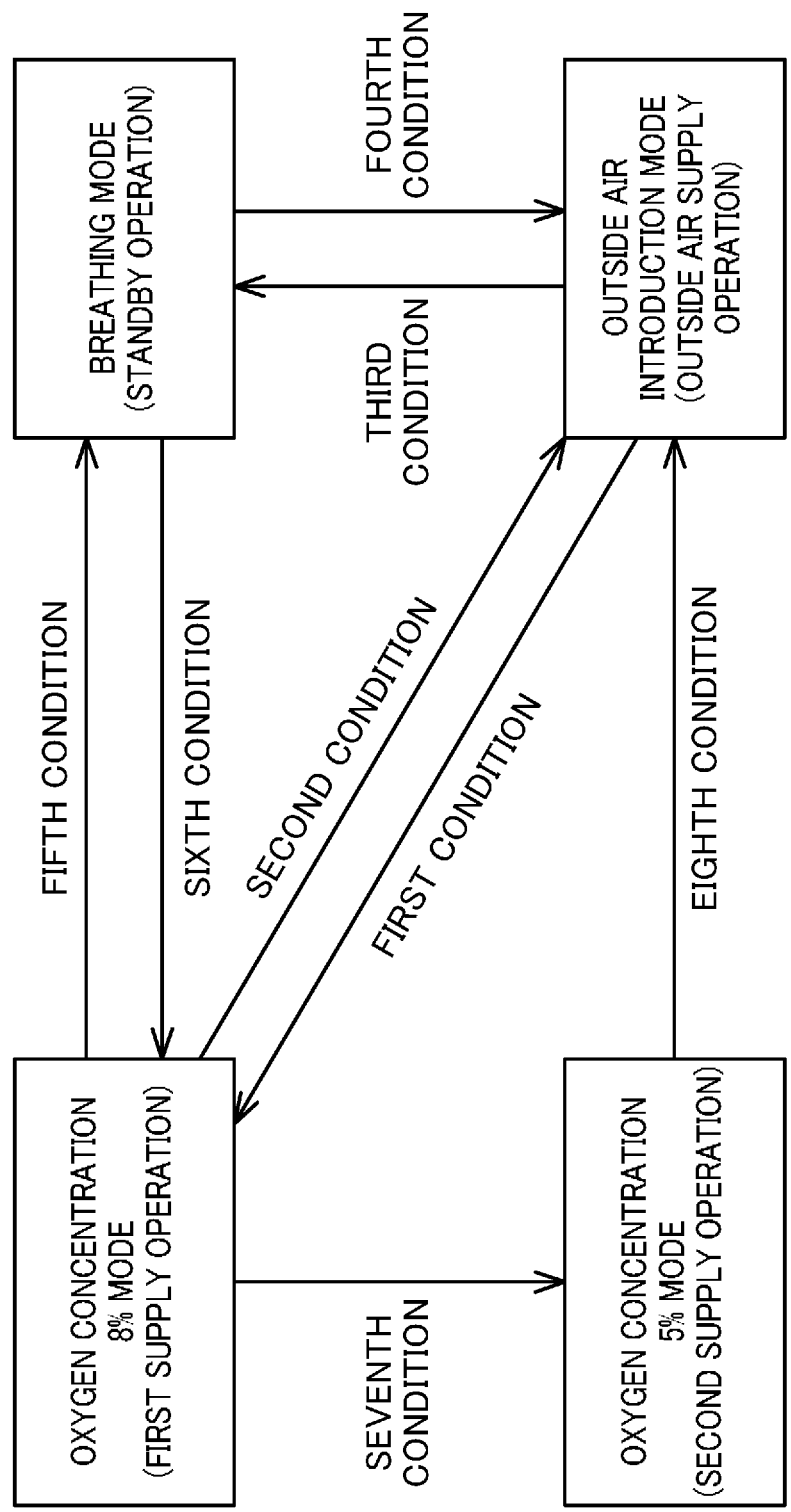
FIG. 12 is a state transition diagram showing operations performed by a controller of the CA system of the embodiment during an air composition maintenance action.

The air composition maintenance action of the CA system (60) will now be described with reference to FIGS. 12 and 13. In the following description, p1 to p4 represent constants that satisfy the relationship "0%<p4<p3<p2<p1≤1.0%," and q1 to q3 represent constants that satisfy the relationship "0%<q3<q2<q1<1.0%." As described above, MV_O2 is the measurement value of the oxygen concentration of the inside air, SP_O2 is the set oxygen concentration of the inside air, MV_CO2 is the measurement value of the carbon dioxide concentration of the inside air, and SP_CO2 is the set carbon dioxide concentration of the inside air. The set oxygen concentration SP_O2 and the set carbon dioxide concentration SP_CO2 are determined based on the type of the plants (15) stored in the container (11), and are input to the controller (55) by an operator.

As will be described in detail later, if the degree to which the carbon dioxide concentration of the inside air increases needs to be reduced during an attempt to reduce the oxygen concentration of the inside air, an operation control flag is set (i.e., defined as "1"). If neither the oxygen concentration of the inside air nor the degree to which the carbon dioxide concentration of the inside air increases needs to be reduced, the operation control flag is cleared (i.e., defined as "0").

When the air composition maintenance action is started, the controller (55) initially instructs the gas supply device (30) to operate in the oxygen concentration 8% mode. In the oxygen concentration 8% mode, the gas supply device (30) supplies the first low oxygen concentration air (having a mean oxygen concentration of 8%) into the container (11). That is to say, in this embodiment, when the action of the CA system (60) is switched from the oxygen concentration reduction action to the air composition maintenance action, the gas supply device (30) continues to supply the low oxygen concentration air into the container (11).

«Oxygen Concentration 8% Mode→Breathing Mode»

If a fifth condition is satisfied during the operation in the oxygen concentration 8% mode, the controller (55) switches the operation of the gas supply device (30) from the oxygen concentration 8% mode to the breathing mode. The fifth condition is a condition where either the sub-condition where the relationship "MV_O2≤SP_O2" and the relationship "MV_CO2≤SP_CO2" continue for 10 minutes or the sub-condition where the relationship "MV_O2≤SP_O2+p2" continues for 10 minutes is satisfied, and the operation control flag is "0."

This fifth condition is satisfied when the carbon dioxide concentration of the inside air needs to be increased, or when the oxygen concentration of the inside air needs to be reduced, and the degree to which the carbon dioxide concentration increases does not need to be reduced during an attempt to reduce the oxygen concentration. At this moment, the controller (55) instructs the gas supply device (30) to operate in the breathing mode. As described above, during the operation in the breathing mode, the exhaust valve (46b) of the exhaust portion (46) is closed. Thus, during the operation in the breathing mode, breathing of the plants (15) stored in the container (11) reduces the oxygen concentration of the inside air, and simultaneously increases the carbon dioxide concentration of the inside air.

《Oxygen Concentration 8% Mode→Oxygen Concentration 5% Mode》

If a seventh condition is satisfied during the operation in the oxygen concentration 8% mode, the controller (55) switches the operation of the gas supply device (30) from the oxygen concentration 8% mode to the oxygen concentration 5% mode. The seventh condition is a condition where the relationship "MV_CO2≥SP_CO2+p1" continues for 10 minutes, and the operation control flag is "1."

This seventh condition is satisfied when the oxygen concentration needs to be reduced, and the degree to which the carbon dioxide concentration increases needs to be reduced during an attempt to reduce the oxygen concentration. At this moment, the controller (55) instructs the gas supply device (30) to operate in the oxygen concentration 5% mode, and to supply the second low oxygen concentration air (having a mean oxygen concentration of 5%) into the container (11).

The second low oxygen concentration air has a lower oxygen concentration than the first low oxygen concentration air, and has a carbon dioxide concentration that is substantially equal to that of the first low oxygen concentration air. During the operation in the oxygen concentration 8% mode and the oxygen concentration 5% mode, the exhaust valve (46b) of the exhaust portion (46) is open. For this reason, if the operation of the gas supply device (30) is switched from the oxygen concentration 8% mode to the oxygen concentration 5% mode, the oxygen concentration of the inside air decreases, and carbon dioxide continues to be discharged from the interior to exterior of the container (11). Thus, if the operation of the gas supply device (30) is switched from the oxygen concentration 8% mode to the oxygen concentration 5% mode, the rate of increase in the amount of carbon dioxide contained in the inside air is lower than that of the case where the operation of the gas supply device (30) is switched from the oxygen concentration 8% mode to the breathing mode.

《Oxygen Concentration 8% Mode→Outside Air Introduction Mode》

If a second condition is satisfied during the operation in the oxygen concentration 8% mode, the controller (55) switches the operation of the gas supply device (30) from the oxygen concentration 8% mode to the outside air introduction mode. The second condition is a condition where the relationship "MV_O2≤SP_O2−p3" continues for 10 minutes.

This second condition is satisfied when the oxygen concentration of the inside air needs to be increased. At this moment, the controller (55) instructs the gas supply device (30) to operate in the outside air introduction mode, and to supply the outside air having an oxygen concentration of 21% into the container (11).

《Breathing Mode→Outside Air Introduction Mode》

If a fourth condition is satisfied during the operation in the breathing mode, the controller (55) switches the operation of the gas supply device (30) from the breathing mode to the outside air introduction mode. The fourth condition is a condition where the relationship "MV_O2≤SP_O2−p3" continues for 10 minutes, and the operation control flag is "0."

This fourth condition is satisfied when the oxygen concentration of the inside air needs to be increased. At this moment, the controller (55) instructs the gas supply device (30) to operate in the outside air introduction mode, and to supply the outside air having an oxygen concentration of 21% into the container (11).

《Oxygen Concentration 5% Mode→Outside Air Introduction Mode》

If an eighth condition is satisfied during the operation in the oxygen concentration 5% mode, the controller (55) switches the operation of the gas supply device (30) from the oxygen concentration 5% mode to the outside air introduction mode. The eighth condition is a condition where the relationship "MV_O2≤SP_O2−p3" continues for 10 minutes, and the operation control flag is "1."

This eighth condition is satisfied when the oxygen concentration of the inside air needs to be increased. At this moment, the controller (55) instructs the gas supply device (30) to operate in the outside air introduction mode, and to supply the outside air having an oxygen concentration of 21% into the container (11).

《Outside Air Introduction Mode→Oxygen Concentration 8% Mode》

If a first condition is satisfied during the operation in the outside air introduction mode, the controller (55) switches the operation of the gas supply device (30) from the outside air introduction mode to the oxygen concentration 8% mode. The first condition is a condition where either the sub-condition where the relationship "MV_O2≥SP_O2+p3" and the relationship "MV_CO2≥SP_CO2+q2" continue for 10 minutes, and the operation control flag is "0," or the sub-condition where the relationship "MV_O2≥SP_O2+p3" continues for 10 minutes, and the operation control flag is "1" is satisfied.

This first condition is satisfied when the oxygen concentration and carbon dioxide concentration of the inside air needs to be reduced, or when the oxygen concentration needs to be reduced, and the degree to which the carbon dioxide concentration increases needs to be reduced during an attempt to reduce the oxygen concentration. At this moment, the controller (55) instructs the gas supply device (30) to operate in the oxygen concentration 8% mode, and to supply the first low oxygen concentration air (having a mean oxygen concentration of 8%) into the container (11).

The first low oxygen concentration air has a lower oxygen concentration than outside air, and has a carbon dioxide concentration that is substantially equal to that of outside air. During the operation in the outside air introduction mode and the oxygen concentration 8% mode, the exhaust valve (46b) of the exhaust portion (46) is open. For this reason, if the operation of the gas supply device (30) is switched from the outside air introduction mode to the oxygen concentration 8% mode, the oxygen concentration of the inside air decreases, and carbon dioxide continues to be discharged from the interior to exterior of the container (11).

《Outside Air Introduction Mode→Breathing Mode》

If a third condition is satisfied during the operation in the outside air introduction mode, the controller (55) switches the operation of the gas supply device (30) from the outside air introduction mode to the breathing mode. The third condition is a condition where the relationship "MV_O2≥SP_O2" and the relationship "MV_CO2≤SP_CO2+q3" continue for 10 minutes, and the operation control flag is "0."

This third condition is satisfied when the degree to which the oxygen concentration of the inside air increases needs to be reduced. At this moment, the controller (55) instructs the gas supply device (30) to operate in the breathing mode. During the operation in the breathing mode, breathing of the plants (15) stored in the container (11) reduces the oxygen concentration of the inside air, and simultaneously increases the carbon dioxide concentration of the inside air.

«Breathing Mode→Oxygen Concentration 8% Mode»

If a sixth condition is satisfied during the operation in the breathing mode, the controller (55) switches the operation of the gas supply device (30) from the breathing mode to the oxygen concentration 8% mode. The sixth condition is a condition where the relationship "MV_O2≤SP_O2−p4" and the relationship "MV_CO2≤SP_CO2+q2" continue for 10 minutes, and the operation control flag is "1."

This sixth condition is satisfied when the oxygen concentration of the inside air needs to be increased, and the carbon dioxide concentration of the inside air needs to be reduced. At this moment, the controller (55) instructs the gas supply device (30) to operate in the oxygen concentration 8% mode, and to supply the first low oxygen concentration air (having a mean oxygen concentration of 8%) into the container (11). This allows the amount of oxygen contained in the air in the container (11) to be gradually larger than during the operation in the breathing mode.

If the operation of the gas supply device (30) is switched from the breathing mode to the oxygen concentration 8% mode, the exhaust valve (46*b*) of the exhaust portion (46) switches from the closed state to the open state, and the inside air starts being discharged through the exhaust passage (46*a*). This allows the inside air containing carbon dioxide to be discharged to the outside of the container (11). Thus, the amount of carbon dioxide in the inside air gradually decreases.

<Operation Control Flag>

Figure 14:
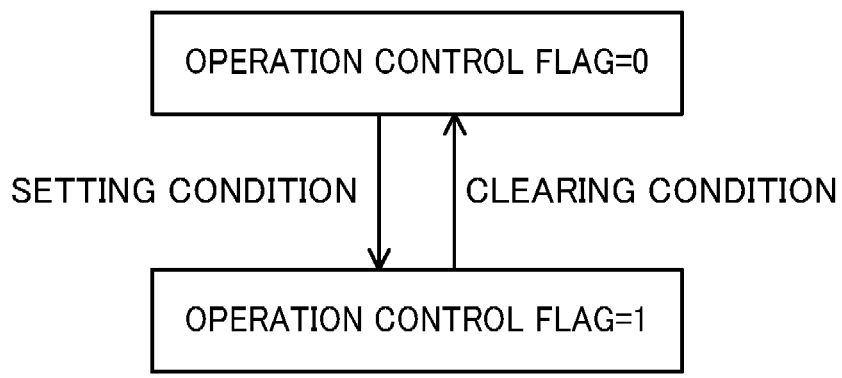
FIG. 14 is a state transition diagram showing how an operation control flag of the controller of the CA system of the embodiment transitions.

The operation control flag will be described. As shown in FIG. 14, if the operation control flag is cleared, and a setting condition on which the operation control flag is set is satisfied, the operation control flag is set (i.e., the value of the operation control flag is changed from "0" to "1"), and if the operation control flag is set, and a clearing condition on which the operation control flag is cleared is satisfied, the operation control flag is cleared (i.e., the value is changed from "1" to "0").

The setting condition is a condition where the relationship "SP_O2−p3≤MV_O2≤SP_O2+p3" and the relationship "MV_CO2≥SP_CO2+q1" continue for 10 minutes. This setting condition is satisfied when the oxygen concentration of the inside air is relatively stable at a value close to the set oxygen concentration SP_O2, and the carbon dioxide concentration of the inside air is much higher than the set carbon dioxide concentration SP_CO2.

The clearing condition is a condition where the relationship "MV_O2≤SP_O2" and the relationship "MV_CO2≤SP_CO2+q2" continue for 10 minutes. This clearing condition is satisfied when the oxygen concentration of the inside air is maintained at a value lower than or equal to the set oxygen concentration SP_O2, and the carbon dioxide concentration of the inside air is a value close to the set carbon dioxide concentration SP_CO2.

As can be seen, if the degree to which the carbon dioxide concentration of the inside air increases needs to be reduced during an attempt to reduce the oxygen concentration of the inside air, an operation control flag is set (i.e., defined as "1"). If neither the oxygen concentration of the inside air nor the degree to which the carbon dioxide concentration of the inside air increases needs to be reduced, the operation control flag is cleared (i.e., defined as "0").

—Feature (1) of First Embodiment—

A CA system (60) of this embodiment includes: a gas supply device (30) producing low oxygen concentration air having a lower oxygen concentration than outside air as a result of removal of oxygen from the outside air, and capable of supplying the low oxygen concentration air and the outside air into a container (11) for storing breathing plants (15); and a controller (55) controlling an operation of the gas supply device (30). The CA system (60) of this embodiment performs an oxygen concentration reduction action for reducing the oxygen concentration of air in the container (11) to a predetermined set oxygen concentration through the gas supply device (30) supplying the low oxygen concentration air into the container (11), and an air composition maintenance action for maintaining the air in the container at a desired composition after termination of the oxygen concentration reduction action.

In the air composition maintenance action, the controller (55) of this embodiment instructs the gas supply device (30) to operate while switching among an oxygen concentration 8% mode (a first supply operation), an oxygen concentration 5% mode (a second supply operation), an outside air introduction mode (an outside air supply operation), and a breathing mode (a standby operation), so that the oxygen concentration of the air in the container will be a set oxygen concentration and the carbon dioxide concentration of the air in the container will be a set carbon dioxide concentration. In the oxygen concentration 8% mode, first low oxygen concentration air is supplied into the container (11). In the oxygen concentration 5% mode, second low oxygen concentration air having a lower oxygen concentration than the first low oxygen concentration air is supplied into the container (11). In the outside air introduction mode, the outside air is supplied into the container (11). In the breathing mode, the supply of the low oxygen concentration air and outside air into the container (11) is kept at rest.

In this embodiment, in the oxygen concentration 5% mode of the gas supply device (30), the second low oxygen concentration air having a lower oxygen concentration than the first low oxygen concentration air and having a carbon dioxide concentration that is substantially equal to that of the first low oxygen concentration air is supplied into the container (11). Thus, in the oxygen concentration 5% mode of the gas supply device (30), the degree to which the carbon dioxide concentration of the inside air increases can be reduced, and the oxygen concentration of the inside air can be lower than that in the oxygen concentration 8% mode.

In this embodiment, while the CA system (60) is performing the air composition maintenance action, the controller (55) instructs the gas supply device (30) to operate while switching among the four operations. Specifically, the gas supply device (30) of the CA system (60) of this embodiment performs more types of operations to maintain the inside air at a desired composition than a known system operating while switching among three operations to maintain the inside air at a desired composition. Thus, this embodiment allows the gas supply device (30) to perform an operation suitable for a situation at that moment (specifically, the relationship between each of the current oxygen concentration and the current carbon dioxide concentration of inside air and an associated one of their respective set values). This allows the oxygen concentration and carbon dioxide concentration of the inside air to reach their respective set values. Thus, the degree to which the freshness of the plants (15) stored in the container (11) decreases can be reduced.

—Feature (2) of First Embodiment—

The controller (55) of this embodiment is configured to selectively switch the operation of the gas supply device (30) from the oxygen concentration 8% mode to either the oxygen concentration 5% mode or the breathing mode during the air composition maintenance action so that the oxygen concentration of inside air decreases, and approaches the set oxygen concentration.

In this embodiment, if, during the operation in the oxygen concentration 8% mode, the oxygen concentration of the inside air needs to be reduced to approach the set oxygen concentration, the controller (55) switches the operation of the gas supply device (30) to either the oxygen concentration 5% mode or the breathing mode. If the operation of the gas supply device (30) is switched from the oxygen concentration 8% mode to the oxygen concentration 5% mode, the oxygen concentration of the inside air decreases to a value that is lower than that in the oxygen concentration 8% mode, and the degree to which the carbon dioxide concentration of the inside air increases is reduced to substantially the same degree as in the oxygen concentration 8% mode. On the other hand, if the operation of the gas supply device (30) is switched from the oxygen concentration 8% mode to the breathing mode, breathing of the plants (15) in the container (11) reduces the oxygen concentration of the inside air, and increases the carbon dioxide concentration thereof.

This embodiment allows the operation of the gas supply device (30) to switch either from the oxygen concentration 8% mode to the oxygen concentration 5% mode or from the oxygen concentration 8% mode to the breathing mode, in accordance with the carbon dioxide concentration of inside air during the operation in the oxygen concentration 8% mode. Thus, this embodiment allows the oxygen concentration and carbon dioxide concentration of the inside air to reach their respective set values. Thus, the degree to which the freshness of the plants (15) stored in the container (11) decreases can be reduced.

—Feature (3) of First Embodiment—

The controller (55) of this embodiment is configured to disallow the operation of the gas supply device (30) from being switched from the oxygen concentration 8% mode to the breathing mode, and to allow the operation of the gas supply device (30) to be switched from the oxygen concentration 8% mode to the oxygen concentration 5% mode, during a period from the satisfaction of the setting condition to the satisfaction of the clearing condition.

The controller (55) of this embodiment controls the switching of the operation of the gas supply device (30) in accordance with whether or not the setting condition and the clearing condition are satisfied. Thus, this embodiment allows the gas supply device (30) to perform an operation suitable for allowing the oxygen concentration and carbon dioxide concentration of the inside air to reach the respective set values.

—Feature (4) of First Embodiment—

In the controller (55) of this embodiment, the setting condition is a condition that is satisfied if, while the oxygen concentration of the inside air is to be reduced, the degree to which the carbon dioxide concentration of the inside air increases needs to be reduced. Specifically, the setting condition is a condition where the following state continues for a first predetermined period (for 10 minutes in this embodiment). In this state, the oxygen concentration MV_O2 of the inside air falls within a predetermined oxygen concentration range including the set oxygen concentration SP_O2 (SP_O2−p3≤MV_O2≤SP_O2+p3), and the difference between the carbon dioxide concentration MV_CO2 and the set carbon dioxide concentration SP_CO2 of the inside air is greater than or equal to a first predetermined value (q1) (MV_CO2−SP_CO2≥q1).

In the controller (55) of this embodiment, the clearing condition is a condition that is satisfied if neither the oxygen concentration of the inside air nor the degree to which the carbon dioxide concentration of the inside air increases needs to be reduced. Specifically, the clearing condition is a condition where the following state continues for a second predetermined period (for 10 minutes in this embodiment). In this state, the oxygen concentration MV_O2 of the inside air is lower than or equal to the set oxygen concentration SP_O2 (MV_O2≤SP_O2), and the difference between the carbon dioxide concentration MV_CO2 and the set carbon dioxide concentration SP_CO2 of the inside air is less than or equal to a second predetermined value (q2) that is less than the first predetermined value (MV_CO2−SP_CO2≤q2).

In the air composition maintenance action of the CA system (60) of this embodiment, during the period from the satisfaction of the setting condition to the satisfaction of the clearing condition (i.e., while the operation control flag is "1"), the difference between the carbon dioxide concentration of the inside air and the set carbon dioxide concentration is relatively large. This shows a great need to reduce the carbon dioxide concentration. During the breathing mode of the gas supply device (30), the breathing of the plants (15) in the container (11) increases the carbon dioxide concentration. To address this problem, the controller (55) of this embodiment does not switch the operation of the gas supply device (30) from the oxygen concentration 8% mode to the breathing mode while the operation control flag is "1" (see the fifth condition in FIG. 13). On the other hand, during the oxygen concentration 5% mode of the gas supply device (30), the second low oxygen concentration air having a carbon dioxide concentration that is substantially equal to that of outside air is supplied into the container (11). Thus, the controller (55) of this embodiment switches the operation of the gas supply device (30) from the oxygen concentration 8% mode to the oxygen concentration 5% mode as necessary while the operation control flag is "1" (see the seventh condition in FIG. 13).

In the air composition maintenance action of the CA system (60) of this embodiment, the controller (55) of this embodiment disallows the gas supply device (30) from operating in the breathing mode, and allows the gas supply device (30) to operate in the oxygen concentration 5% mode, during the period from the satisfaction of the setting condition to the satisfaction of the clearing condition (i.e., while the operation control flag is "1"). During the period from the satisfaction of the setting condition to the satisfaction of the clearing condition, the difference between the carbon dioxide concentration of the inside air and the set carbon dioxide concentration is relatively large. This shows a great need to reduce the carbon dioxide concentration. To satisfy the need, during the period from the satisfaction of the setting condition to the satisfaction of the clearing condition, the controller (55) disallows the gas supply device (30) from operating in the breathing mode in which breathing of the plants (15) in the container (11) increases the carbon dioxide concentration, while allowing the gas supply device (30) to operate in the oxygen concentration 5% mode in which the second low oxygen concentration air having a carbon dioxide concentration that is substantially equal to that of outside air is supplied into the container (11).

Thus, according to this embodiment, the degree to which the carbon dioxide concentration of the inside air increases can be reduced, and the oxygen concentration of the inside air can be reduced. As a result, the oxygen concentration and carbon dioxide concentration of the inside air are allowed to reach their respective set values. Thus, the degree to which the freshness of the plants (15) stored in the container (11) decreases can be reduced.

—Feature (5) of First Embodiment—

The controller (55) of this embodiment is configured to switch the operation of the gas supply device (30) from the oxygen concentration 8% mode, the oxygen concentration 5% mode, or the breathing mode to the outside air introduction mode during the air composition maintenance action so that the oxygen concentration of inside air increases, and approaches the set oxygen concentration.

In this embodiment, if, during the operation in the oxygen concentration 8% mode, the oxygen concentration 5% mode, or the breathing mode, the oxygen concentration of the inside air needs to be increased to approach the set oxygen concentration, the controller (55) switches the operation of the gas supply device (30) to the outside air introduction mode. In the outside air introduction mode of the gas supply device (30), outside air having a high oxygen concentration is supplied into the container (11). This increases the oxygen concentration of the inside air.

—Feature (6) of First Embodiment—

The controller (55) of this embodiment is configured to switch the operation of the gas supply device (30) from the outside air introduction mode to either the oxygen concentration 8% mode or the breathing mode during the air composition maintenance action so that the oxygen concentration of inside air decreases, and approaches the set oxygen concentration.

In this embodiment, if, during the operation in the outside air introduction mode, the oxygen concentration of the inside air needs to be reduced to approach the set oxygen concentration, the controller (55) switches the operation of the gas supply device (30) to either the oxygen concentration 8% mode or the breathing mode. In the oxygen concentration 8% mode of the gas supply device (30), first low oxygen concentration air having a lower oxygen concentration than outside air is supplied into the container (11). This reduces the oxygen concentration of the inside air. In the breathing mode of the gas supply device (30), oxygen is consumed through the breathing of the plants (15) stored in the container (11). This reduces the oxygen concentration of the inside air.

—Feature (7) of First Embodiment—

The controller (55) of this embodiment is configured to switch the operation of the gas supply device (30) from the breathing mode to the oxygen concentration 8% mode during the air composition maintenance action so that the carbon dioxide concentration of inside air decreases, and approaches the set carbon dioxide concentration.

In this embodiment, if, during the operation in the breathing mode, the carbon dioxide concentration of the inside air needs to be reduced to approach the set carbon dioxide concentration, the controller (55) switches the operation of the gas supply device (30) to the oxygen concentration 8% mode. In the oxygen concentration 8% mode of the gas supply device (30), first low oxygen concentration air having a carbon dioxide concentration that is substantially equal to that of outside air is supplied into the container (11). This reduces the carbon dioxide concentration of the inside air.

—Feature (8) of First Embodiment—

The controller (55) of this embodiment is configured to instruct the gas supply device (30) to initially operate in the oxygen concentration 8% mode during the air composition maintenance action.

In this embodiment, if the action of the CA system (60) switches from the oxygen concentration reduction action to the air composition maintenance action, the controller (55) instructs the gas supply device (30) to initially operate in the oxygen concentration 8% mode, and then switches the operation of the gas supply device (30) to the oxygen concentration 5% mode, the outside air introduction mode, or the breathing mode as necessary. In the oxygen concentration reduction action, the gas supply device (30) mainly operates in the oxygen concentration 5% mode. Thus, in this embodiment, when the action of the CA system (60) switches from the oxygen concentration reduction action to the air composition maintenance action, the gas supply device (30) continues to supply the low oxygen concentration air into the container (11).

In this case, typically, the oxygen concentration of the inside air is not completely uniform in the entire space inside the container (11). For this reason, if the supply of the low oxygen concentration air into the container (11) is stopped immediately after a value measured by the oxygen sensor (51) reaches the set oxygen concentration to terminate the oxygen concentration reduction action, the spread of the oxygen that is unevenly distributed in the internal space of the container (11) may increase the oxygen concentration of the inside air, which may exceed the set oxygen concentration.

To address this problem, the CA system (60) of this embodiment continues to supply the first low oxygen concentration air into the container (11) even after the termination of the oxygen concentration reduction action. Thus, according to this embodiment, the oxygen concentration of the inside air can be reliably maintained at the set oxygen concentration after the termination of the oxygen concentration reduction action.

While the embodiments and variations thereof have been described above, it will be understood that various changes in form and details may be made without departing from the spirit and scope of the claims. The foregoing embodiments and variations thereof may be combined and replaced with each other as far as intended functions of the present disclosure are not deteriorated.

INDUSTRIAL APPLICABILITY

As can be seen from the foregoing description, the present disclosure is useful for an inside air control system.

DESCRIPTION OF REFERENCE CHARACTERS

11 Container (Storage Box)
15 Plant
30 Gas Supply Device
55 Controller
60 CA System (Inside Air Control System)

The invention claimed is:

1. An inside air control system comprising:
a gas supply device including an air pump and an adsorbent-filled vessel, the air pump being configured to selectively pressurize and depressurize the adsorbent-filled vessel to produce, through adsorption of nitrogen, first low oxygen concentration air having a lower oxygen concentration than outside air and second low oxygen concentration air having a lower oxygen concentration than the first low oxygen concentration air, as a result of removal of oxygen from the outside air, the gas supply device including passages to pump the first low oxygen concentration air, the second low oxygen concentration air, and the outside air into the storage box for storing a breathing plant; and a processor programmed to control an operation of the gas supply device according to memory-stored instructions, the inside air control system performing an oxygen concentration reduction action to reduce an oxygen concentration of inside air in the storage box to a predetermined set oxygen concentration through the gas supply device supplying the first and second low oxygen concentration air into the storage box, and an air composition maintenance action to maintain the inside air at a desired composition after termination of the oxygen concentration reduction action, the inside air control system further comprising a bypass passage through which the outside air discharged from the air pump passes to bypass the adsorbent-filled vessel, during the air composition maintenance action, the processor being configured to instruct the gas supply device to operate while switching among
- a first supply operation in which the first low oxygen concentration air is supplied into the storage box through the passages;
- a second supply operation in which the second low oxygen concentration air is supplied into the storage box through the passages;
- an outside air supply operation in which the outside air is supplied into the storage box through the bypass passage and the passages without flowing into the adsorbent-filled vessel; and
- a standby operation in which supply of the first low oxygen concentration air, the second low oxygen concentration air and the outside air into the storage box is maintained at rest, to maintain the oxygen concentration of the inside air at the set oxygen concentration, and a carbon dioxide concentration of the inside air at a predetermined set carbon dioxide concentration, the inside air control system comprises a supply-discharge switching mechanism that includes a valve and switches between a gas supply operation in which one of the first low oxygen concentration air and the second oxygen concentration air is selectively supplied to an inside and a gas discharge operation in which the first and second low oxygen concentration air is discharged to an outside, and during the air composition maintenance action,
the processor performs
switching from the first supply operation to the second supply operation,
switching from the second supply operation to the outside air supply operation,
switching from the first supply operation to the outside air supply operation,
switching from the outside air supply operation to the first supply operation,
switching from the first supply operation to the standby operation,
switching from the standby operation to the first supply operation,
switching from the standby operation to the outside air supply operation, and
switching from the outside air supply operation to the standby operation; and
the processor disallows
switching from the second supply operation to the first supply operation; and
switching from the outside air supply operation to the second supply operation.

2. The device of claim 1, wherein
during the air composition maintenance action, the processor is configured to selectively switch the operation of the gas supply device from the first supply operation to either the second supply operation or the standby operation so that the oxygen concentration of the inside air decreases, and approaches the predetermined set oxygen concentration.

3. The device of claim 1, wherein
during the air composition maintenance action, the processor is configured to disallow the operation of the gas supply device from being switched from the first supply operation to the standby operation, and to allow the operation of the gas supply device to be switched from the first supply operation to the second supply operation, during a period from satisfaction of a predetermined setting condition to satisfaction of a predetermined clearing condition.

4. The device of claim 3, wherein
the setting condition is a condition that is satisfied if, while the oxygen concentration of the inside air is to be reduced, a degree to which the carbon dioxide concentration of the inside air increases needs to be reduced, and
the clearing condition is a condition that is satisfied if neither the oxygen concentration of the inside air nor the degree to which the carbon dioxide concentration of the inside air increases needs to be reduced.

5. The device of claim 3, wherein
the setting condition is a condition where a state in which the oxygen concentration of the inside air falls within a predetermined oxygen concentration range including the set oxygen concentration and a difference between the carbon dioxide concentration and the set carbon dioxide concentration of the inside air is greater than or equal to a first predetermined value continues for a first predetermined period, and
the clearing condition is a condition where a state in which the oxygen concentration of the inside air is lower than or equal to the set oxygen concentration and the difference between the carbon dioxide concentration and the set carbon dioxide concentration of the inside air is less than or equal to a second predetermined value that is less than the first predetermined value continues for a second predetermined period.

6. The device of claim 1, wherein
during the air composition maintenance action, the processor is configured to switch the operation of the gas supply device from the first supply operation, the second supply operation, or the standby operation to the outside air supply operation so that the oxygen concentration of the inside air increases, and approaches the set oxygen concentration.

7. The device of claim 1, wherein
during the air composition maintenance action, the processor is configured to switch the operation of the gas supply device from the outside air supply operation to either the first supply operation or the standby operation so that the oxygen concentration of the inside air decreases, and approaches the set oxygen concentration.

8. The device of claim 1, wherein
during the air composition maintenance action, the processor is configured to switch the operation of the gas supply device from the standby operation to the first supply operation so that the carbon dioxide concentration of the inside air decreases, and approaches the set carbon dioxide concentration.

9. The device of claim 1, wherein
the processor is configured to instruct the gas supply device to initially perform the first supply operation during the air composition maintenance action.

10. An inside air control system comprising:
a gas supply device including an air pump and an adsorbent-filled vessel, the air pump being configured to selectively pressurize and depressurize the adsorbent-filled vessel to produce, through adsorption of nitrogen, first low oxygen concentration air having a lower oxygen concentration than outside air and second low oxygen concentration air having a lower oxygen concentration than the first low oxygen concentration air, as a result of removal of oxygen from the outside air, the gas supply device including passages to pump the first low oxygen concentration air, the second low oxygen concentration air, and the outside air into the storage box for storing a breathing plant; and
a processor programed to control an operation of the gas supply device according to memory-stored instructions,
the inside air control system further comprising a bypass passage through which the outside air discharged from the air pump passes to bypass the adsorbent-filled vessel,
the processor being configured to instruct the gas supply device to operate while switching among
    a first supply operation in which the first low oxygen concentration air is supplied into the storage box through the passages;
    a second supply operation in which the second low oxygen concentration air is supplied into the storage box through the passages;
    an outside air supply operation in which the outside air is supplied into the storage box through the bypass passage and the passages without flowing into the adsorbent-filled vessel; and
    a standby operation in which supply of the first low oxygen concentration air, the second low oxygen concentration air and the outside air into the storage box is maintained at rest,
to maintain the oxygen concentration of the inside air at the set oxygen concentration, and a carbon dioxide concentration of the inside air at a predetermined set carbon dioxide concentration,
    the inside air control system comprises
    a supply-discharge switching mechanism that includes a valve and switches between a gas supply operation in which one of the first low oxygen concentration air and the second low oxygen concentration air is selectively supplied to an inside and a gas discharge operation in which the first and second low oxygen concentration air is discharged to an outside, and
    the processor performs
        switching from the first supply operation to the second supply operation;
        switching from the second supply operation to the outside air supply operation;
        switching from the first supply operation to the outside air supply operation;
        switching from the outside air supply operation to the first supply operation;
        switching from the first supply operation to the standby operation;
        switching from the standby operation to the first supply operation;
        switching from the standby operation to the outside air supply operation; and
        switching from the outside air supply operation to the standby operation, and the processor disallows
        switching from the second supply operation to the first supply operation; and
        switching from the outside air supply operation to the second supply operation.

* * * * *